(12) United States Patent
Blumer

(10) Patent No.: US 11,795,668 B2
(45) Date of Patent: Oct. 24, 2023

(54) FIXTURE ACCESSORY APPARATUS AND METHOD OF USING SAME

(71) Applicant: Paul Arlo Blumer, Monroe, NC (US)

(72) Inventor: Paul Arlo Blumer, Monroe, NC (US)

(73) Assignee: BluMare, L.L.C., Monroe, NC (US)

( * ) Notice: Subject to any disclaimer, the term of this patent is extended or adjusted under 35 U.S.C. 154(b) by 39 days.

(21) Appl. No.: 17/154,566

(22) Filed: Jan. 21, 2021

(65) Prior Publication Data

US 2021/0140152 A1 May 13, 2021

Related U.S. Application Data

(60) Provisional application No. 62/964,398, filed on Jan. 22, 2020.

(51) Int. Cl.
*E03B 9/02* (2006.01)
*F16K 27/12* (2006.01)
*F16L 5/00* (2006.01)

(52) U.S. Cl.
CPC .............. *E03B 9/027* (2013.01); *F16K 27/12* (2013.01); *F16L 5/00* (2013.01); *Y10T 137/6977* (2015.04); *Y10T 137/7062* (2015.04)

(58) Field of Classification Search
CPC . E03B 9/025; E03B 9/027; E03B 9/04; E03B 9/06; E03C 1/042; E03C 2201/50; F16K 27/12; Y10T 137/6977; Y10T 137/698; Y10T 137/7046; Y10T 137/7062; F16L 5/00
USPC ............ 50/60–62; 137/359, 360, 377–382.5; 285/45, 46
See application file for complete search history.

(56) References Cited

U.S. PATENT DOCUMENTS

| | | | | |
|---|---|---|---|---|
| 299,203 A | * | 5/1884 | Crane | F16L 5/00 |
| | | | | 126/317 |
| 453,461 A | * | 6/1891 | Beaton | F16L 5/00 |
| | | | | 285/46 |
| 456,682 A | * | 7/1891 | Stockham | F16L 5/00 |
| | | | | 126/317 |
| 571,766 A | * | 11/1896 | Jarecki | F16L 5/00 |
| | | | | 126/317 |
| 1,209,037 A | * | 12/1916 | Rosenfeld | F16L 5/00 |
| | | | | 292/357 |
| 1,278,895 A | * | 9/1918 | Farley | F23J 13/04 |
| | | | | 285/46 |
| 2,686,530 A | * | 8/1954 | Dire | F16K 27/12 |
| | | | | 137/381 |
| 4,103,701 A | | 8/1978 | Jeng | |

(Continued)

*Primary Examiner* — Kevin F Murphy
*Assistant Examiner* — Jonathan J Waddy
(74) *Attorney, Agent, or Firm* — ASHLEY LAW FIRM P.C.; Stephen S. Ashley, Jr.

(57) ABSTRACT

Existing plumbing fixtures, such as hose bibs, sillcocks, spigots often become loose over time due to stripped holes of securing screws, rusted screws, deterioration of material behind, or inadequate installation from the start. A fixture accessory adapted to tighten the loose fixture can include a plate or split-plate assembly that can slide behind the fixture to secure it without removing the fixture. The fixture can be secured to the plate by a variety of attachment means such as screws, bolts, clamps, or an adhesive, and the plate can be secured to the wall by a variety of attachment means. Also disclosed is a system to firmly hold a freeze-prevention cover over a plumbing fixture.

15 Claims, 23 Drawing Sheets

(56) References Cited

U.S. PATENT DOCUMENTS

| | | | |
|---|---|---|---|
| 4,244,394 A * | 1/1981 | Hartselle, III | F16K 27/12 137/375 |
| 4,456,027 A * | 6/1984 | Belgard | F16K 27/12 24/301 |
| 4,490,954 A * | 1/1985 | Cresti | E03C 1/042 285/46 |
| 4,550,451 A | 11/1985 | Hubbard | |
| 4,577,655 A * | 3/1986 | Carroll | F16K 49/00 138/149 |
| 4,748,787 A | 6/1988 | Harbeke | |
| 4,804,160 A | 2/1989 | Harbeke | |
| 4,804,211 A | 2/1989 | Larson et al. | |
| 4,920,708 A | 5/1990 | MacLeod et al. | |
| 4,989,278 A * | 2/1991 | Kostorz | E03C 1/042 285/46 |
| 5,135,022 A * | 8/1992 | Kovey | E03C 1/0402 4/675 |
| 5,236,228 A | 8/1993 | Lawton | |
| 5,385,330 A * | 1/1995 | Joseph | F16L 5/10 285/341 |
| 5,456,050 A | 10/1995 | Ward | |
| 5,526,619 A * | 6/1996 | Vagedes | E03B 9/00 52/220.1 |
| 5,588,681 A * | 12/1996 | Parks | F16L 5/00 285/46 |
| 5,598,670 A | 2/1997 | Humphrey et al. | |
| 5,641,185 A | 6/1997 | Harth | |
| 5,799,686 A * | 9/1998 | Tuomey | F16K 27/12 24/369 |
| 5,803,508 A | 9/1998 | Lowella | |
| 5,918,431 A * | 7/1999 | Schiedegger | E04C 1/392 52/220.1 |
| 5,927,111 A * | 7/1999 | Nachbauer | F16K 35/10 70/179 |
| D423,909 S | 5/2000 | Hartin | |
| 6,361,084 B1 | 3/2002 | Zarbo | |
| 6,378,910 B1 | 4/2002 | Maiman | |
| D483,651 S * | 12/2003 | Sander | D8/349 |
| 7,055,863 B1 | 6/2006 | Commeville et al. | |
| D595,385 S | 6/2009 | Luth | |
| 7,568,314 B2 | 8/2009 | Collins | |
| 8,272,396 B2 | 9/2012 | Brienza | |
| 8,881,468 B2 * | 11/2014 | McMullen | F21V 21/02 52/302.1 |
| 9,140,003 B1 * | 9/2015 | Gretz | E03B 9/025 |
| D749,708 S | 2/2016 | Smith | |
| 10,151,112 B2 * | 12/2018 | Lechuga | F16L 21/08 |
| 10,214,883 B2 | 2/2019 | Chapla | |
| 10,533,591 B2 | 1/2020 | Guerra et al. | |
| D875,511 S | 2/2020 | Liu et al. | |
| 10,557,253 B2 | 2/2020 | Hunt | |
| D921,168 S | 6/2021 | Wehrli | |
| 11,639,756 B1 | 5/2023 | Jacoway et al. | |
| 2002/0062601 A1 * | 5/2002 | Gilleran | E03C 1/02 52/58 |
| 2002/0108316 A1 | 8/2002 | Miller | |
| 2002/0108328 A1 * | 8/2002 | Richardson | E03C 1/021 52/220.8 |
| 2004/0084086 A1 * | 5/2004 | Stachowiak | F16K 27/12 137/382 |
| 2005/0247009 A1 * | 11/2005 | Vagedes | E03B 7/10 52/698 |
| 2007/0039660 A1 | 2/2007 | Hickman | |
| 2009/0007971 A1 * | 1/2009 | Ball | F16L 3/00 137/315.12 |
| 2010/0116359 A1 * | 5/2010 | Ball | E04G 15/061 137/360 |
| 2011/0220221 A1 * | 9/2011 | Ball | E03C 1/042 137/357 |
| 2013/0025707 A1 | 1/2013 | Mcphail | |
| 2017/0342689 A1 | 11/2017 | Chapla | |
| 2018/0291597 A1 * | 10/2018 | Hunt | E03C 1/042 |
| 2019/0376622 A1 | 12/2019 | Thuston et al. | |
| 2020/0378513 A1 * | 12/2020 | Kowalski | E03B 7/12 |
| 2022/0290763 A1 | 9/2022 | Brady et al. | |

\* cited by examiner

FIXTURE ACCESSORY APPARATUS AND METHOD OF USING SAME

CROSS REFERENCE TO RELATED APPLICATIONS

This application claims priority to U.S. Provisional Patent Application No. 62/964,398, filed Jan. 22, 2020, which is incorporated herein by reference.

TECHNICAL FIELD

The present invention relates to the mechanical arts. An embodiment of the invention comprises an apparatus for use with a plumbing fixture, such as a hose bib, sillcock or spigot. Another embodiment of the invention comprises a method of repairing an existing plumbing fixture, such as a hose bib, sillcock or spigot.

BACKGROUND

Existing plumbing fixtures, such as hose bibs, sillcocks, and spigots, often become loose over time due to stripped holes for securing screws, rusted screws, deterioration of material behind, or inadequate installation of the fixture. Removing these fixtures in order to secure them is often difficult and can result in damage to the fixture and/or plumbing. When removal is attempted, leaks or breaks are very common in older plumbing. A solution that is easy to install and can fit a variety of fixtures is lacking.

A prior attempt to solve this problem includes a device that supplies an opening for the pipe and fixture to mount through. To secure the fixture, one must remove the fixture. This can be problematic with older, more fragile pipes and can result in the fixture being in worse condition than before the attempted repair. For existing fixtures which are not secure but functional, removal is not advisable. Also, such prior devices cannot be used with a variety of fixtures. The many homes and businesses having at least one loose fixture reflects the significant need for a product to effectively solve this problem.

Another problem relates to the installation of covers on outdoor fixtures for preventing freezing of the fixture. Often, such freeze-prevention covers tend to sag because of deficient fastening devices of the covers. When the fixture freezes, frustration and significant cost can result. As such, there is a need for a means to securely hold various freeze-prevention covers to the wall behind the fixture with adequate and equal pressure on the seal.

SUMMARY

Accordingly, an object of the present invention is to provide an accessory that can tighten an existing plumbing fixture and can be installed without removing the fixture and/or cutting or breaking a pipe. Another object of the present invention is to provide a method to securely hold a freeze-prevention cover to the wall adjacent to a plumbing fixture. These and other objects of the invention can be achieved in various embodiments of the invention described below.

An embodiment of the invention comprises a plate or a split-plate design, made of a sturdy material that can be slid behind an existing fixture, such as a hose bib, sillcock, or spigot, without removing the fixture.

According to an embodiment, the fixture can be secured to the plate by attachment means such as screws, bolts, clamps, or epoxy adhesive, and the plate secured to the wall by any means such as a screws, bolts, clamps, or epoxy adhesive.

A fixture accessory apparatus according to an embodiment of the invention can be used on almost any fixture regardless of hole patterns, sizes, or brands. Thus, the problem described can be efficiently solved without the removal of any fixture, or the cutting of any pipe.

Another embodiment of the invention comprises a hose bib apparatus that can securely hold a freeze-prevention cover over the fixture. The apparatus helps hold the cover centered and from both sides. The apparatus can be adapted for holding tools or nozzles, strain reliefs, and other items around the fixture as well.

An embodiment of the invention comprises an apparatus for securing a fixture extending from a wall comprising a plate member having a slot formed therein proximate a center of the plate member. The slot is adapted to receive a portion of the fixture adjacent to the wall, whereby the plate member can be positioned intermediate the fixture and the wall and frictionally engage the fixture and the wall.

According to an embodiment of the invention, the fixture can be a plumbing fixture, such as a hose bib, sillcock or spigot.

According to another embodiment of the invention, the apparatus includes means for attaching the plate member to the fixture, such as screws, bolts, clamps, or an adhesive, and wherein the fixture comprises a plumbing fixture attached to a pipe and the plate member can be attached to the fixture without disconnecting the fixture from the pipe.

According to another embodiment of the invention, the apparatus includes means for attaching the plate member to the wall, such as screws, bolts, clamps, or an adhesive.

According to another embodiment of the invention, the plate member is comprised metal, plastic or a composite of metal and plastic.

According to another embodiment of the invention, the plate member is substantially diamond shaped.

According to another embodiment of the invention, first and second openings are formed proximate opposite corners of the plate member. The slot is intermediate the first and second openings and approximately equidistance to the first and second openings. The first and second openings are adapted to receive a fastener therethrough and into the wall whereby the plate member can be attached to the wall.

According to another embodiment of the invention, third and fourth openings are formed in the plate member adapted to receive fasteners therethrough to attach the plate member to the fixture, and further wherein the plate member can be attached to a variety of fixtures.

Another embodiment of the invention comprises a kit for securing a fixture extending from a wall comprising a first plate member having a slot formed therein proximate a center of the plate member. The slot is adapted to receive a portion of the fixture adjacent to the wall whereby the plate member can be positioned intermediate the fixture and the wall and frictionally engage the fixture and the wall. The apparatus can include at least one opening formed in the first plate member to receive a fastener therethrough to attach the plate member to the wall.

According to an embodiment of the invention, the kit can include a second plate member identical to the first plate member. The second plate member has at least one opening formed therein. The first plate member is adapted to be positioned on a first side of the fixture, the second plate member is adapted to be positioned on an opposite side of the fixture, and the first and second plate members can be moved into an overlapping orientation in which the opening(s) of the first plate member is aligned with the opening(s) of the second member whereby a fastener can be positioned therethrough to attach the first plate member to the second plate member.

According to an embodiment of the invention, each plate member includes a first section and a second section. The depth of the first section is approximately twice the depth of the second section.

According to another embodiment of the invention, the fixture can be a hose bib, sillcock or spigot that is attached to a pipe, and each plate member comprises an arcuate semi-tubular flange section positioned proximate the slot. Each flange section has at least one opening formed therein for receiving a fastener through the opening and frictionally engage the pipe connected to the fixture.

According to another embodiment of the invention, the kit includes a freeze-prevention cover for positioning over the fixture adapted for attachment to the first plate member.

According to another embodiment of the invention, a pair of elongate cord members can be attached to the cover, and a pair of retaining members can be attached to the first plate member and releasably retain the elongate cord members, whereby the cover can be attached to the first plate member.

According to an embodiment of the invention, the plate member is substantially diamond shaped, and has first and second openings positioned proximate opposite corners of the plate member.

According to another embodiment of the invention, a first fastener is adapted to be positioned through the first retaining member and the first opening to attach the first retaining member to the first plate member, and a second fastener is adapted to be positioned through the second retaining member and the second opening to attach the second retaining member to the first plate member.

Another embodiment of the invention comprises a method of securing a fixture extending from a wall to minimize movement of the fixture relative to the wall. The method can include providing a fixture accessory comprising a plate member having a slot formed therein proximate a center of the plate member, and positioning the plate member intermediate the fixture and the wall with a portion of the fixture positioned within the slot. The plate member can be attached to the wall, and to the fixture.

According to an embodiment of the invention, at least one opening is formed in the plate member and a fastener(s) is positioned through the opening(s) and into the wall. The fixture need not be removed from its pipe.

Another embodiment of the invention comprises a method of securely positioning a freeze-prevention cover over a plumbing fixture to help prevent damage to the fixture caused by exposure to cold weather. A freeze-prevention cover can be attached to the plate member.

DESCRIPTION OF PREFERRED EMBODIMENTS AND BEST MODE

Figure 1:
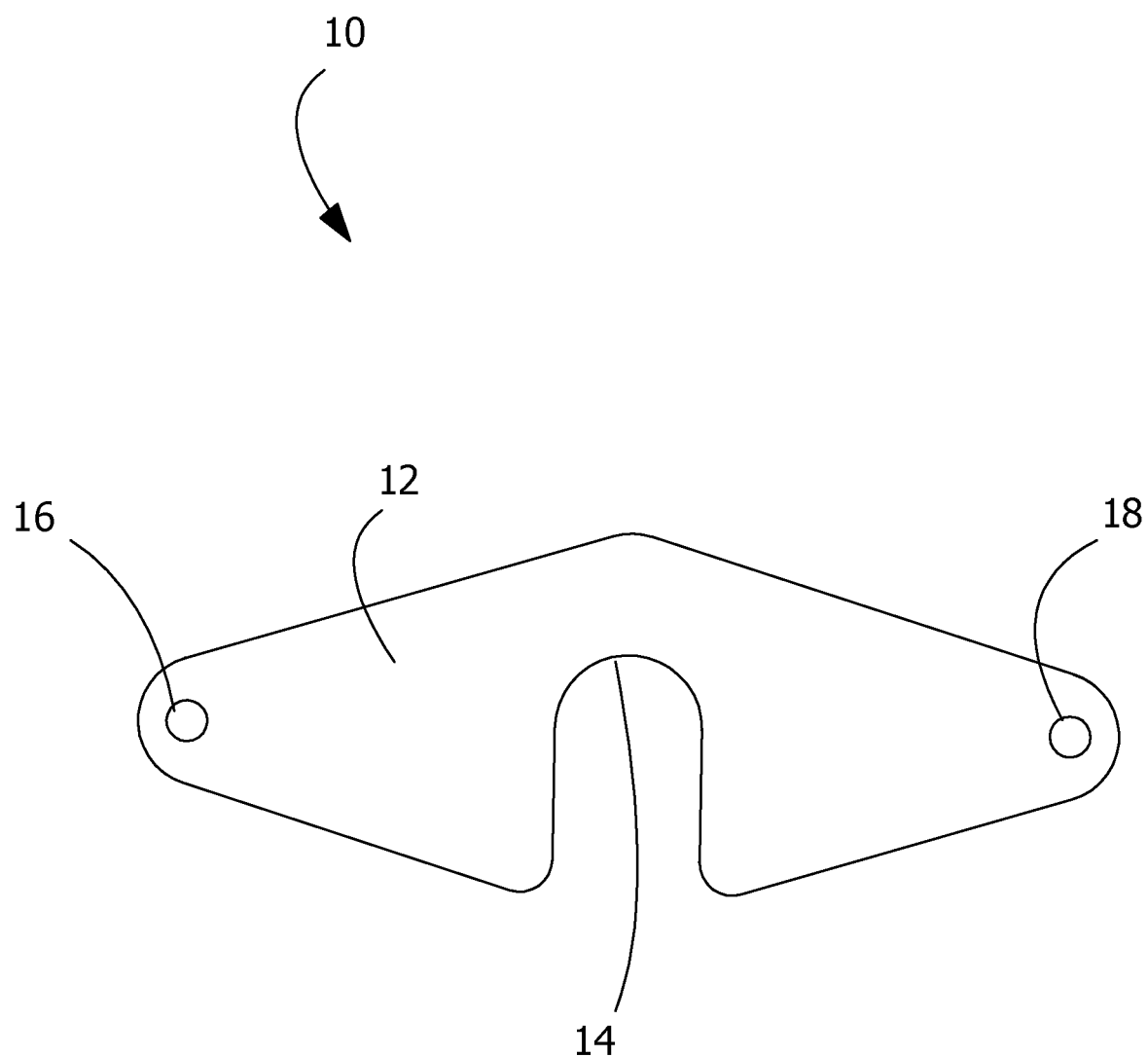
FIG. 1 is a front elevation view of a fixture accessory apparatus according to an embodiment of the invention.
Figure 2:
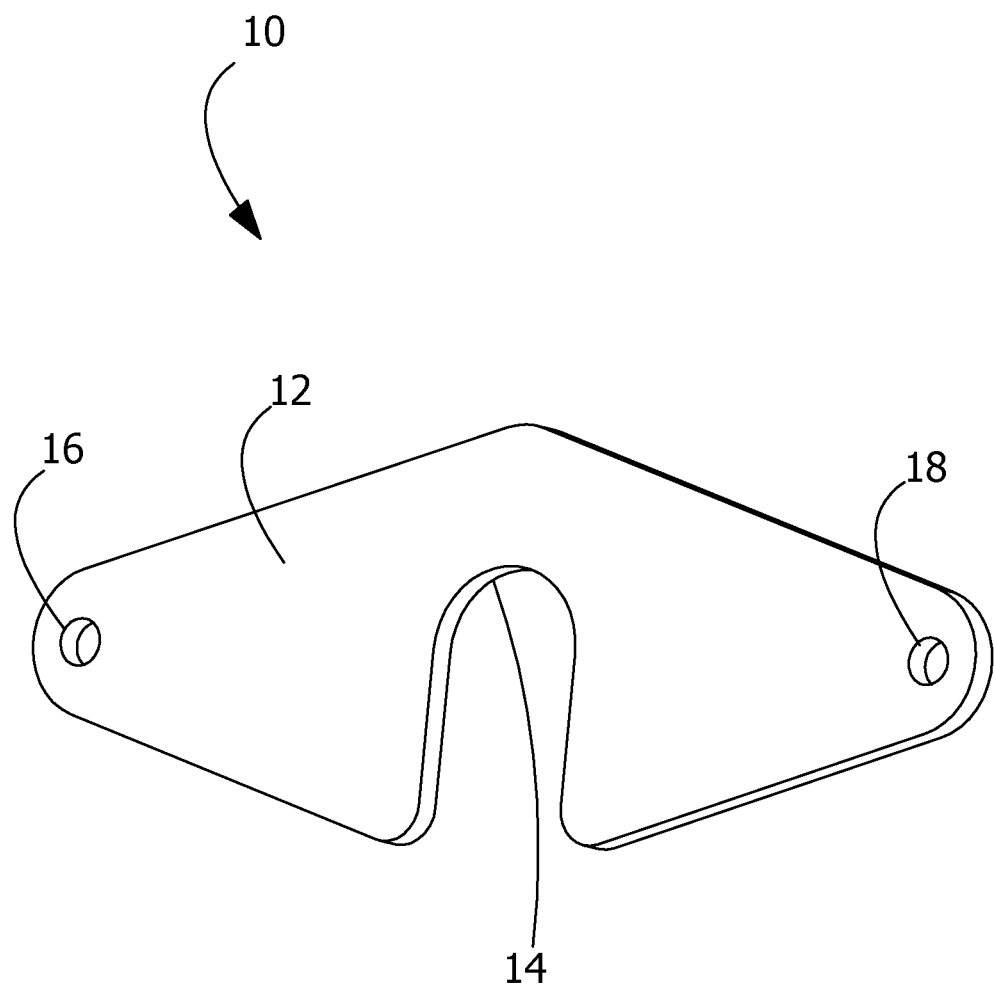
FIG. 2 is a perspective view of the apparatus of FIG. 1.

A fixture accessory apparatus according to a preferred embodiment of the invention is illustrated in FIGS. 1-5 and shown generally at reference numeral 10. The apparatus 10 can be used to secure an existing loose (unsecured) fixture, such as a hose bib, sillcock, spigot, or other fixture. The apparatus 10 comprises a plate 12 having a diamond-like shape as shown in FIG. 1. The plate 12 is comprised of a sturdy material, such as a metal, plastic or a composite material. A large U-shaped slot 14 is formed proximate the center of the plate 12, as shown in FIGS. 1 and 2. The slot 14 can fit almost every application for hose bibs and like fixtures. A pair of circular openings 16, 18 can be formed at opposite ends of the plate 12, as shown in FIGS. 1 and 2.

Figure 3A:
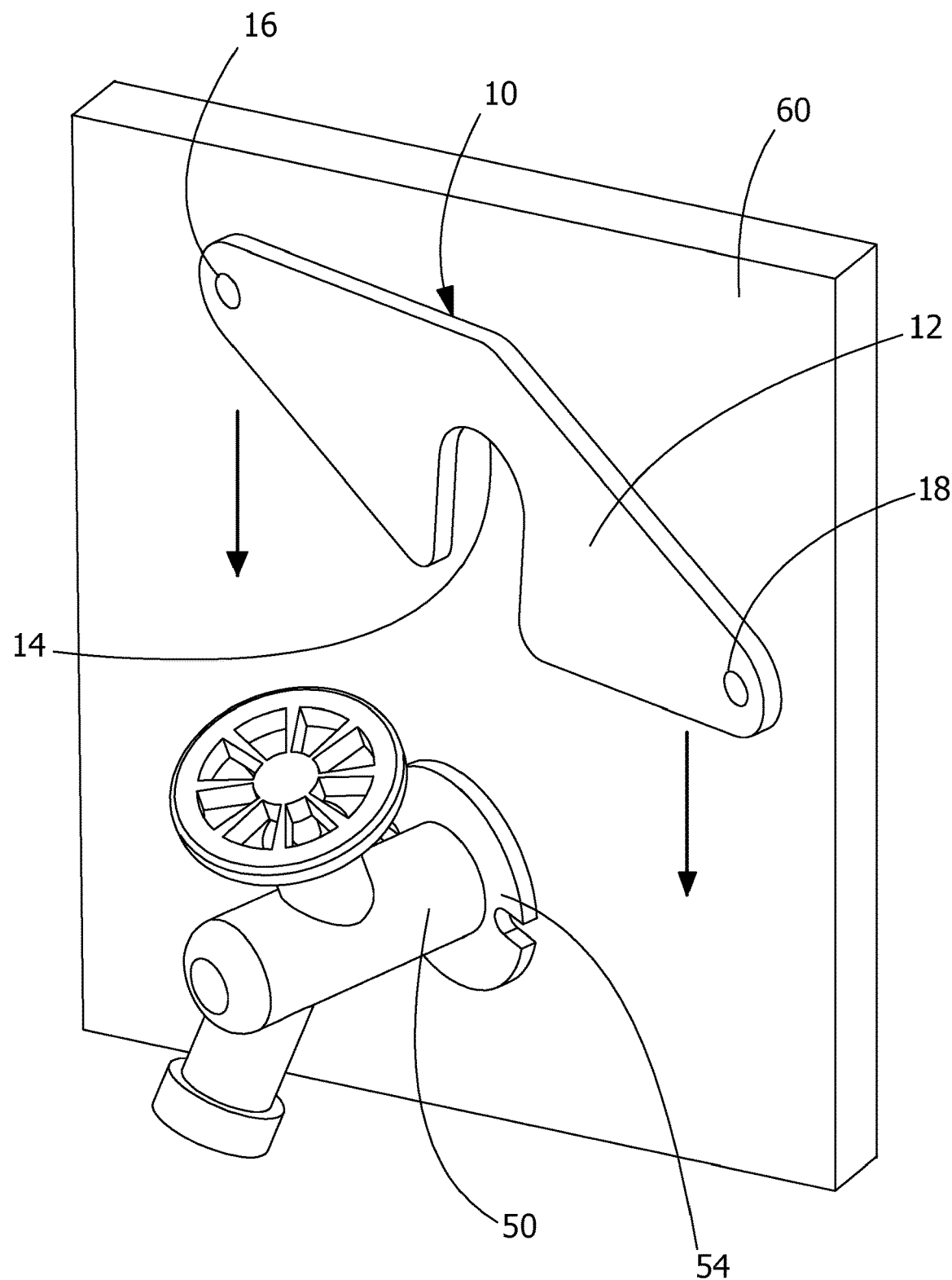
FIGS. 3A-3E are environmental views of the apparatus of FIG. 1.
Figure 3B:
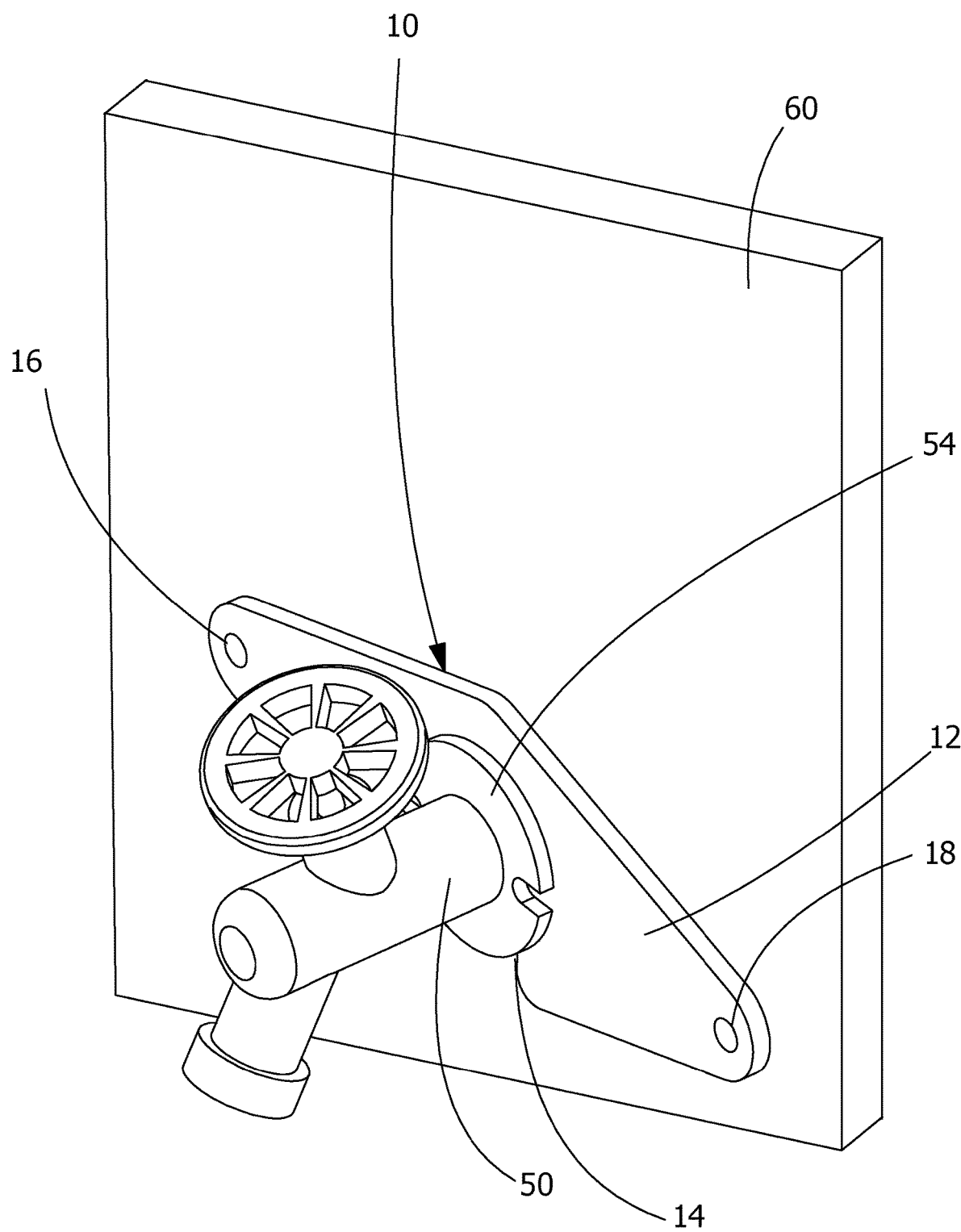

In a method of using the apparatus 10 according to a preferred embodiment of the invention, the apparatus 10 can be installed adjacent to a loose plumbing fixture, such as a hose bib 50, shown in FIGS. 3A-3E. The user slides the plate 12 tight to the wall 60 behind the loose fixture 50, positioning the pipe 52 and fixture joint 54 into the slot 14 of the plate 12, as shown in FIGS. 3A and 3B. The user centers the plate 12, attaches the plate 12 to the wall 60, and attaches the fixture 50 to the plate 12. As such, all can be secured without removing the fixture 50 or cutting the pipe 52.

Figure 3C:
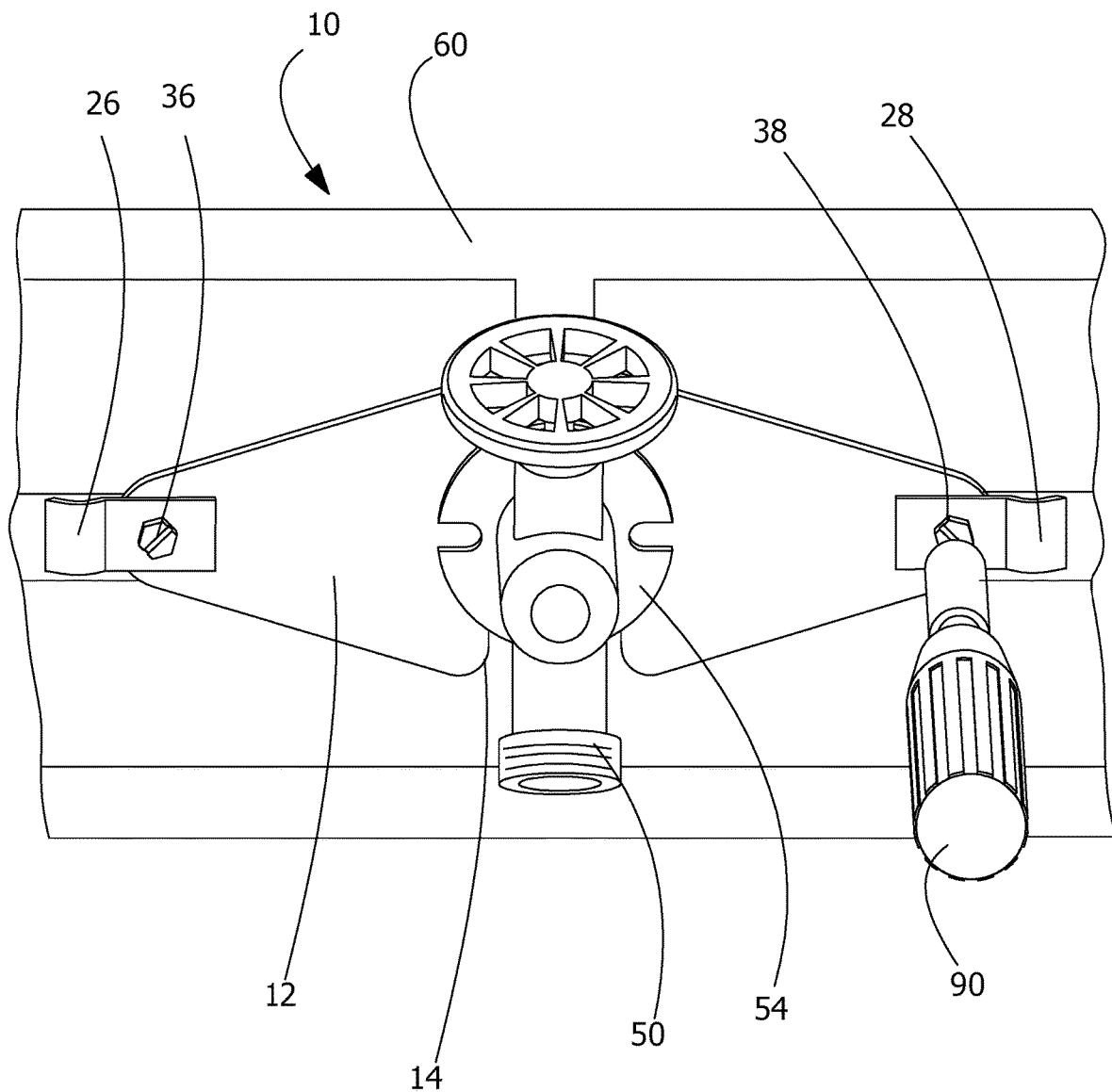
Figure 3D:
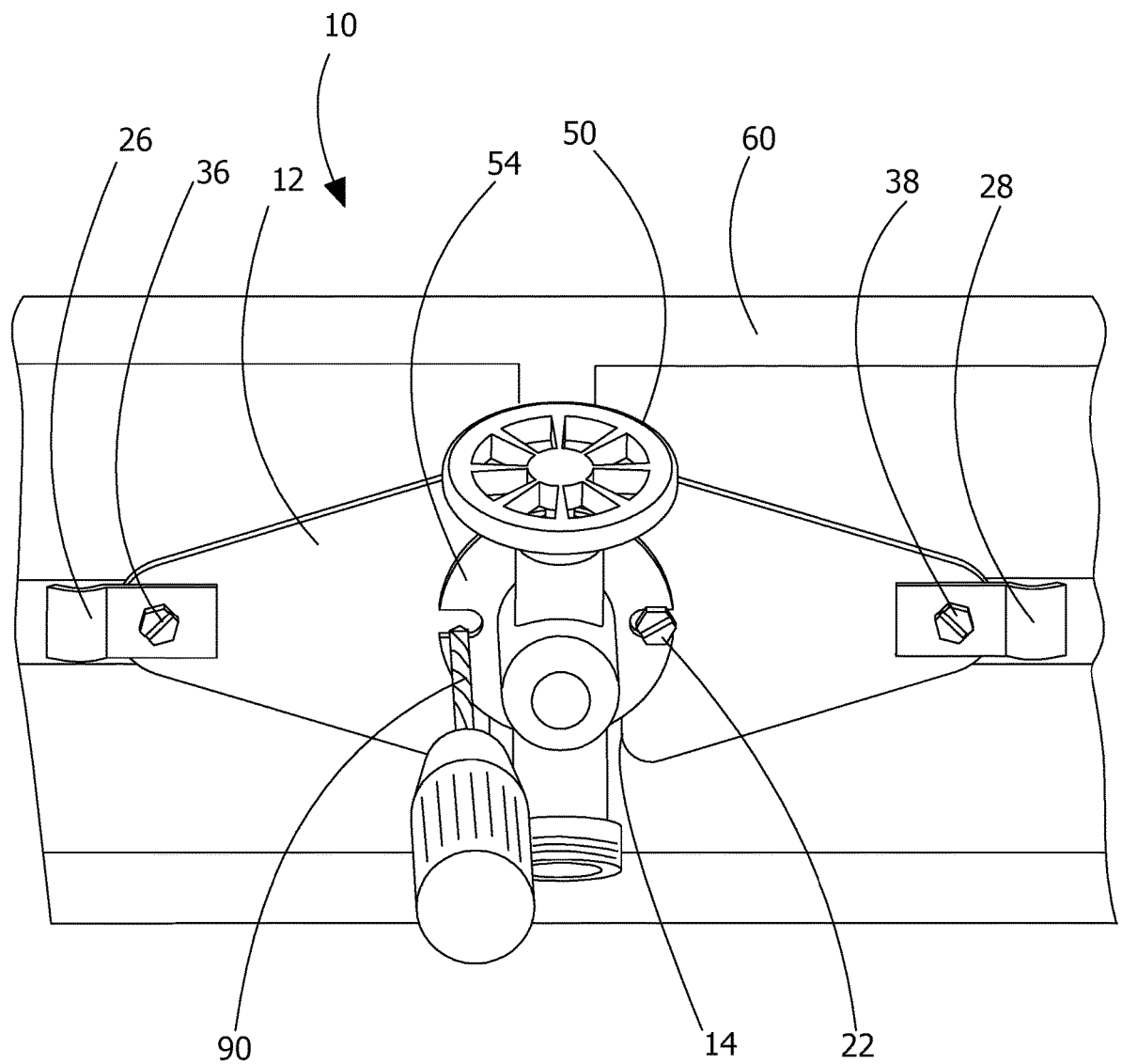
Figure 3E:
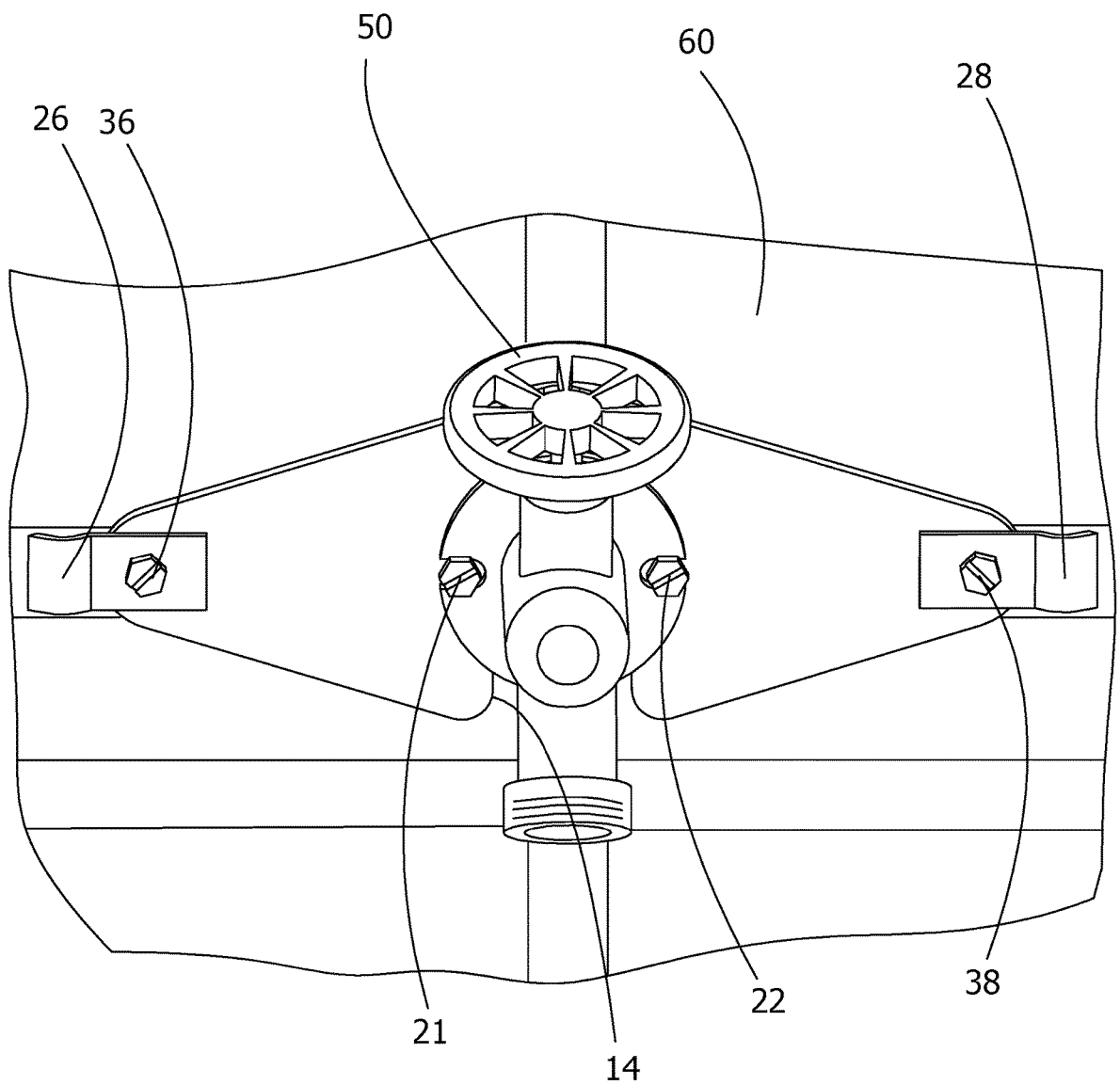

Holes can be drilled into the wall 60 that are aligned with the plate openings 16, 18, and fastening members such as plate screws 36, 38 can be positioned through the openings 16, 18, respectively, and into the drilled holes of the wall 60 to attach the apparatus 10 to the wall 60, as shown in FIG. 3C. The apparatus 10 can be secured to the hose bib 50 by drilling holes through the plate 12 and into the wall 60 adjacent opposite sides of the hose bib joint 54, and fastening members such as short screws 21, 22 are positioned therethrough, as shown in FIG. 3D. The outer edge of the plate 12 can be sealed with silicone caulk or other suitable sealant. In a preferred embodiment, attachment members such as arcuate clips 26, 28 can be attached to the plate 12 by the plate screws 36, 38, respectively, as shown in FIGS. 3C and 3D.

Figure 4A:
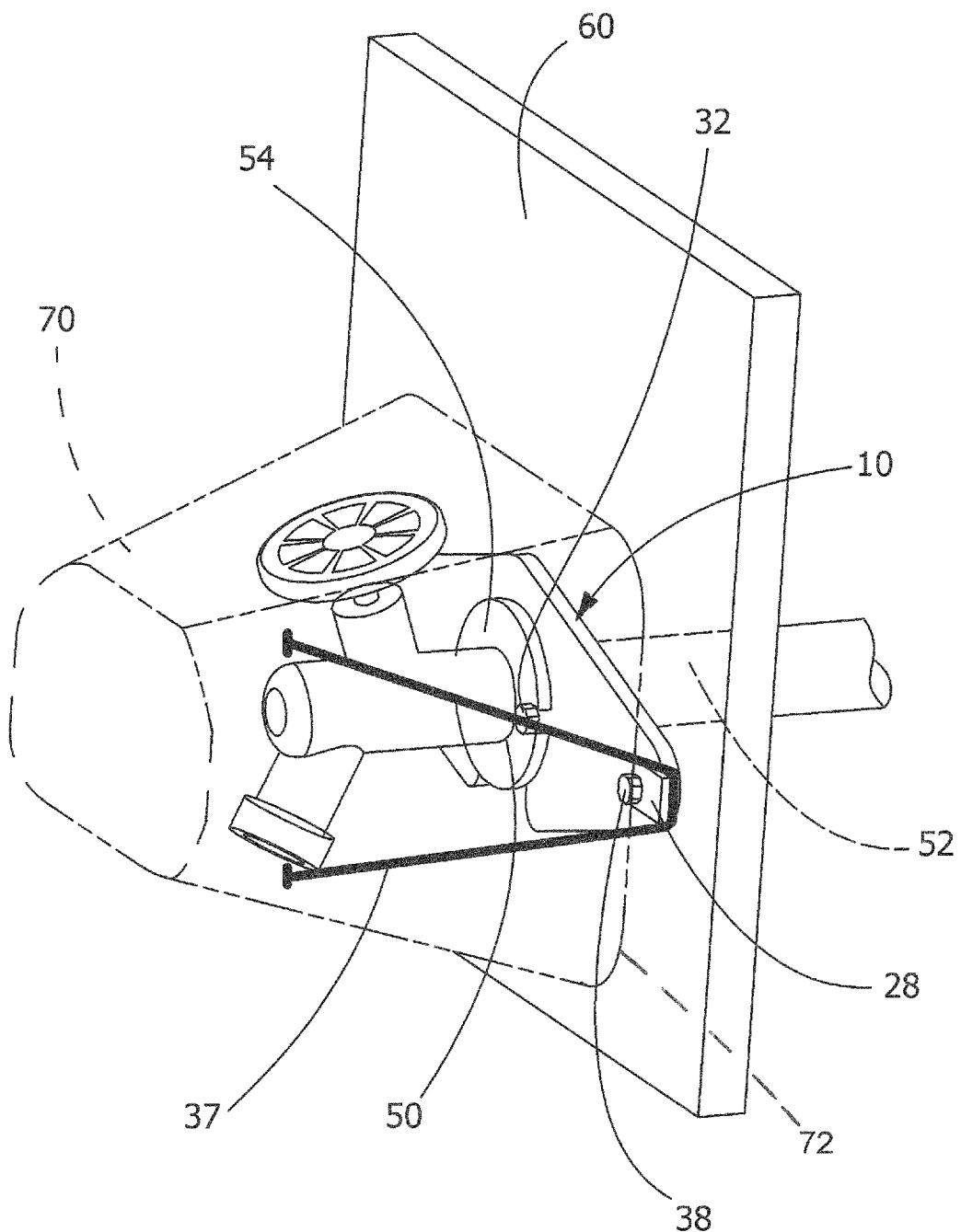
FIGS. 4A and 4B are environmental views of the apparatus of FIG. 1.
Figure 4B:
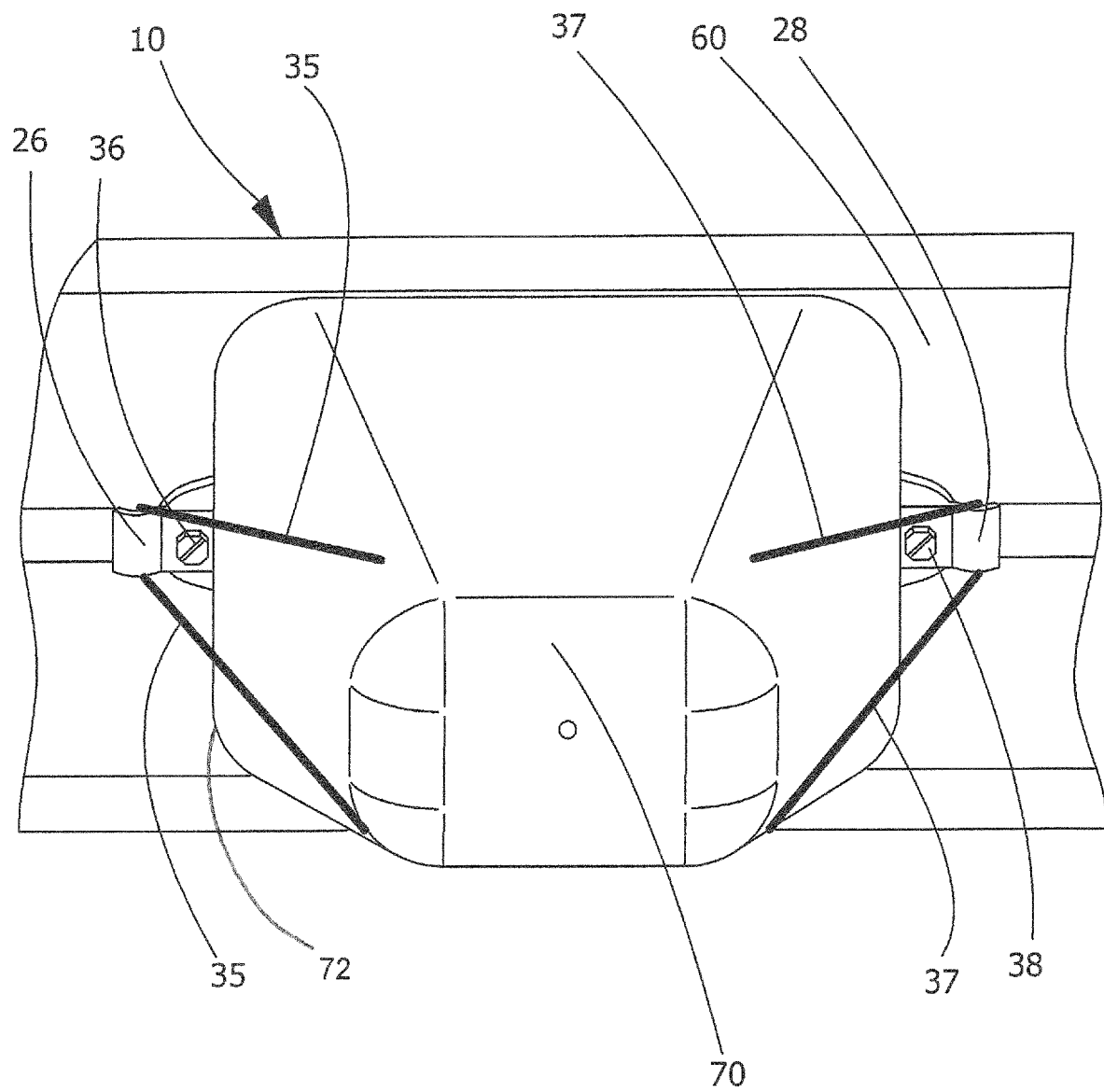

A preferred embodiment of the invention comprises an improved method of securing a freeze prevention cover 70 over the hose bib 50, as illustrated in FIGS. 4A and 4B. This method utilizes the apparatus 10 to hold the cover 70 centered and from both sides. To accomplish this the plate 12 is shaped like a flat oval diamond with a mounting hole 16, 18 on either side in-line with the saddle of the large slot 14, which is in the center and channels to the bottom.

As shown in FIGS. 4A and 4B, two pairs of holes can be formed in a freeze-prevention cover 70, and an elongate elastic member, such as a marine bungee cord 35, 37 can be positioned through each pair of holes in the cover 70. Each cord 35, 37 can be looped through a pair of holes in the cover 70, and each end of the cord 35, 37 can be tied in a knot within the interior of the cover 70 to attach the cord 35, 37 to the cover 70. Most of the length of each cord 35, 37 hangs on the outside of the cover 70. Preferably each cord 35, 37 is approximately fourteen inches long. As shown in FIGS. 4A and 4B, an outer edge 72 of the cover 70 is positioned against the wall 60. The fixture 50 is contained within the interior of the cover 70, as shown in FIG. 4A, and the retaining members 26, 28 are outside of the cover 70, as shown in FIG. 4B. Each bungee cord 35, 37 can be pulled outwardly from the cover 70 and positioned on one of the retaining clips 26, 28 of the apparatus 10, as shown in FIGS. 4A and 4B. This securely maintains the freeze-prevention cover 70 over the fixture 50. The dual cords 35, 37 pull opposite sides of the cover 70 toward the wall 60, providing a generally tighter attachment than conventional covers utilizing a single attachment cord. In addition, because the cords 35, 37 are external to the cover 70, it is significantly easier for the user to install over the fixture than conventional covers in which the attachment cord is housed inside the cover.

Figure 5:
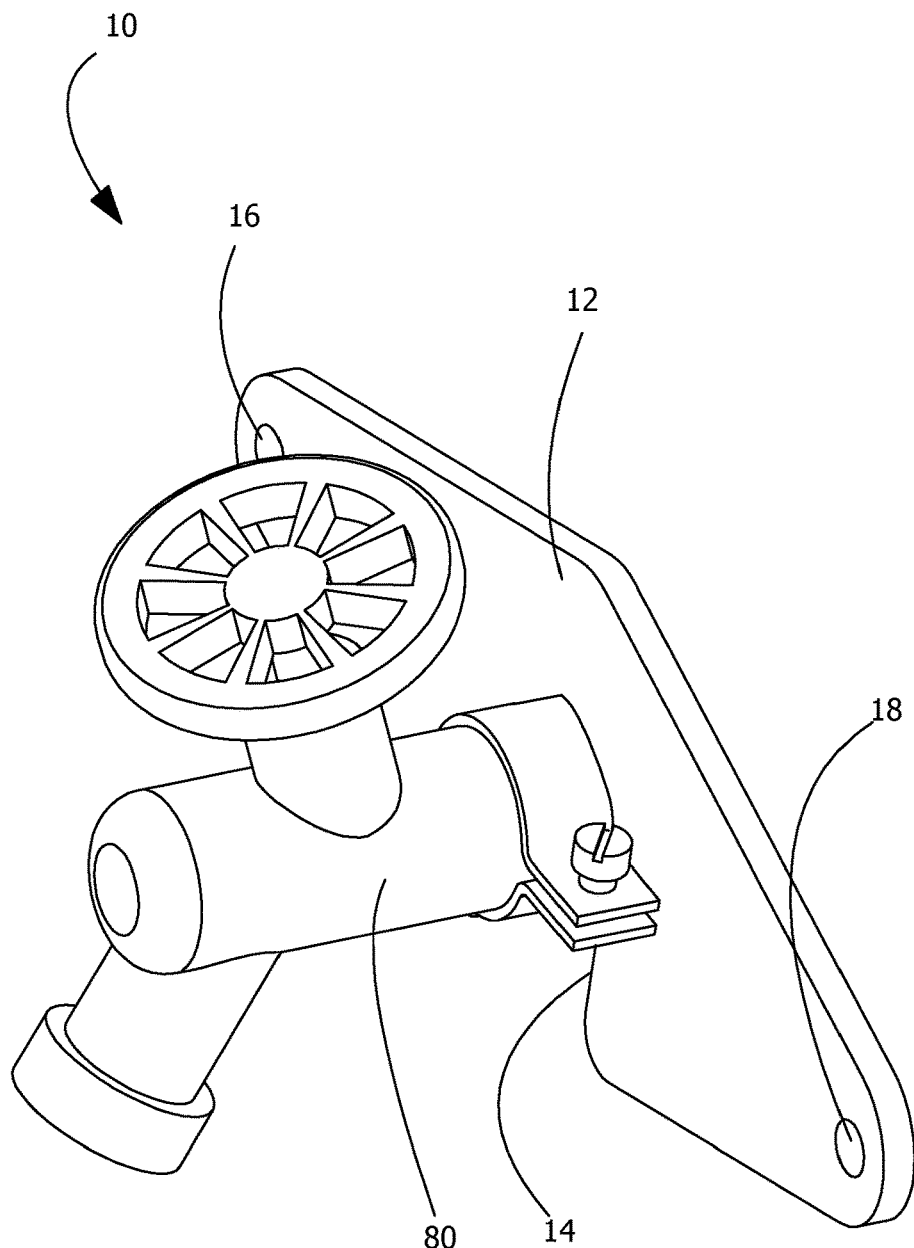
FIG. 5 is an environmental perspective view of the apparatus of FIG. 1.

The size of the apparatus 10 can be varied to accommodate different fixtures in different environments. For example, the size of the apparatus 10 can be made small to use in tight spaces such as a framed enclosure, or on a small block. FIG. 5 illustrates use of the apparatus 10 with a flangeless fixture, such as a spigot 80.

Figure 6:
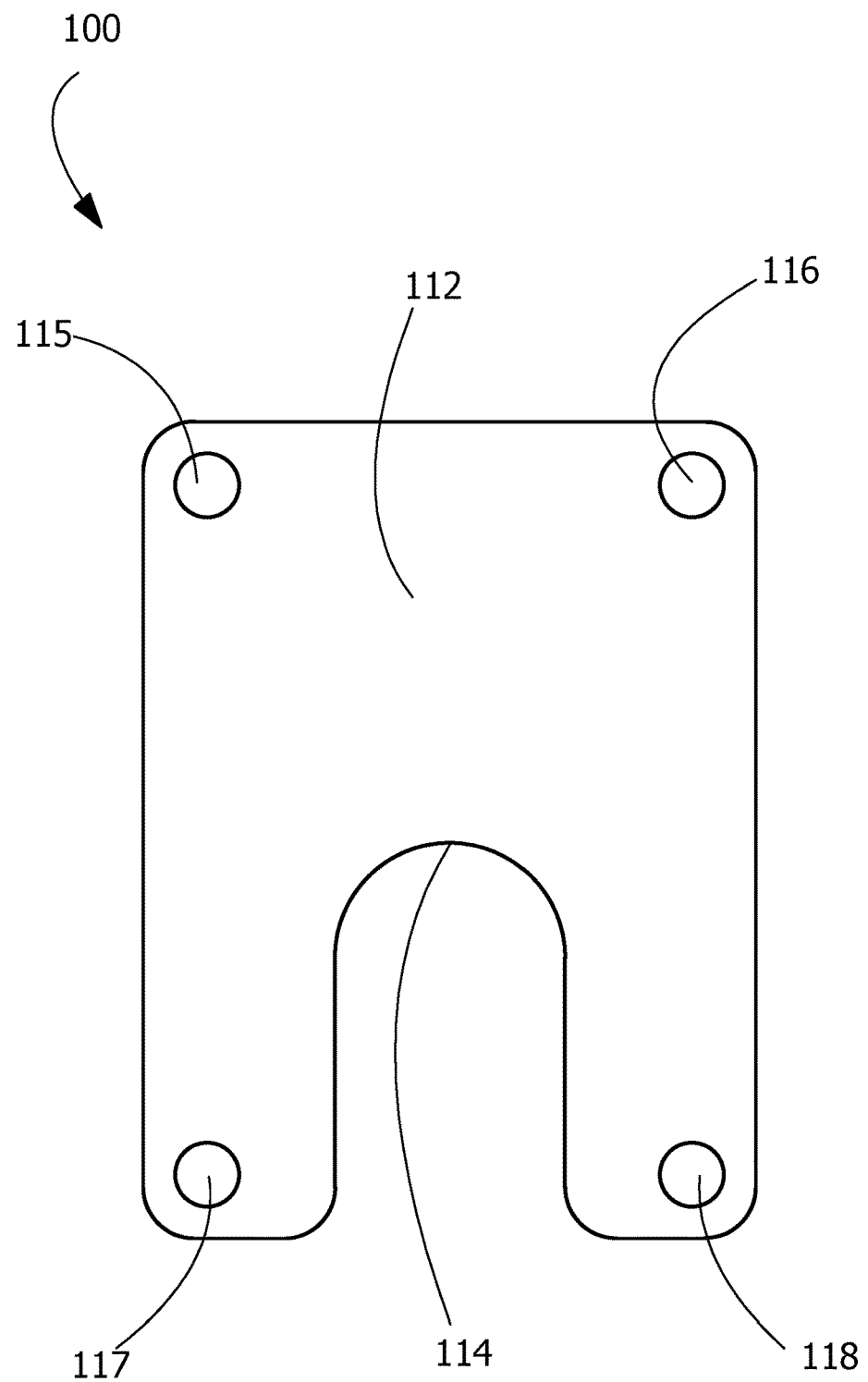
FIG. 6 is a front elevation view of a fixture accessory apparatus according to another embodiment of the invention.
Figure 7:
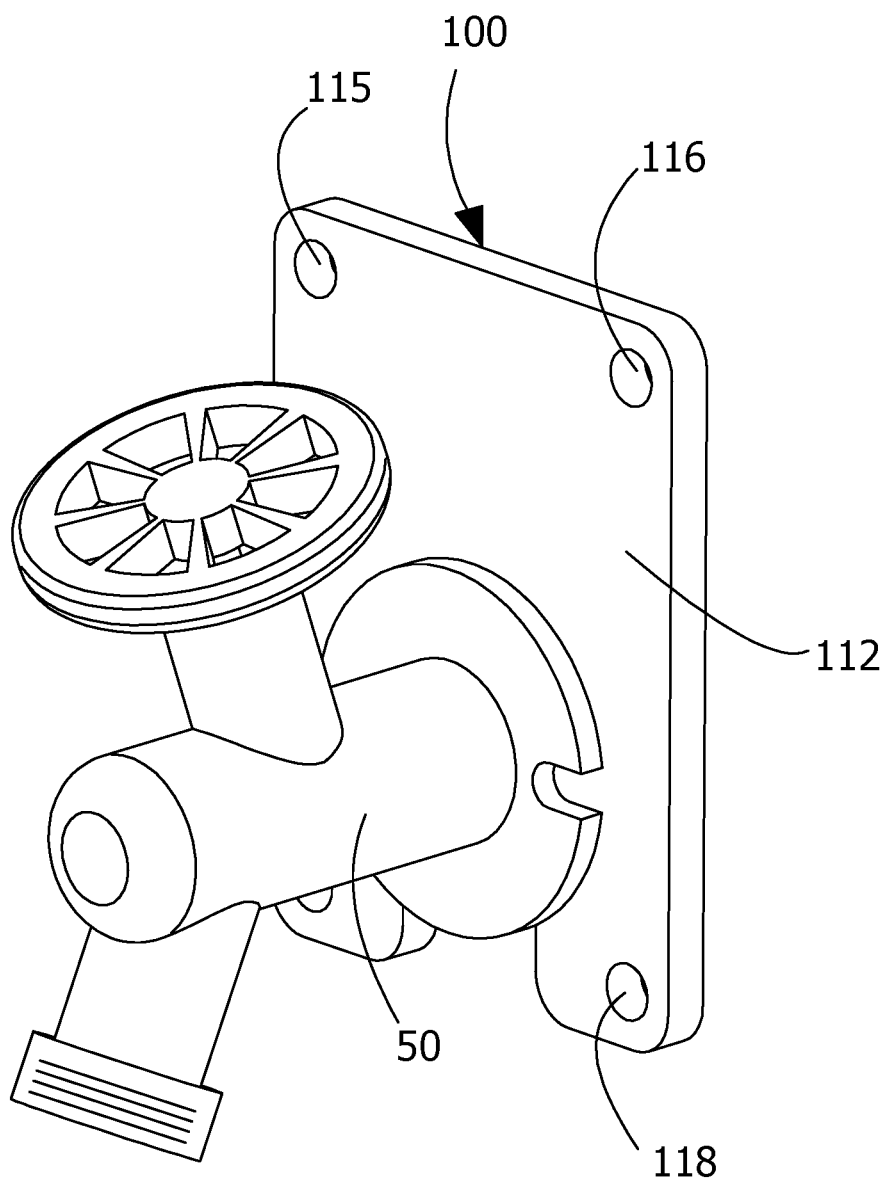
FIG. 7 is an environmental perspective view of the apparatus of FIG. 6.
Figure 8:
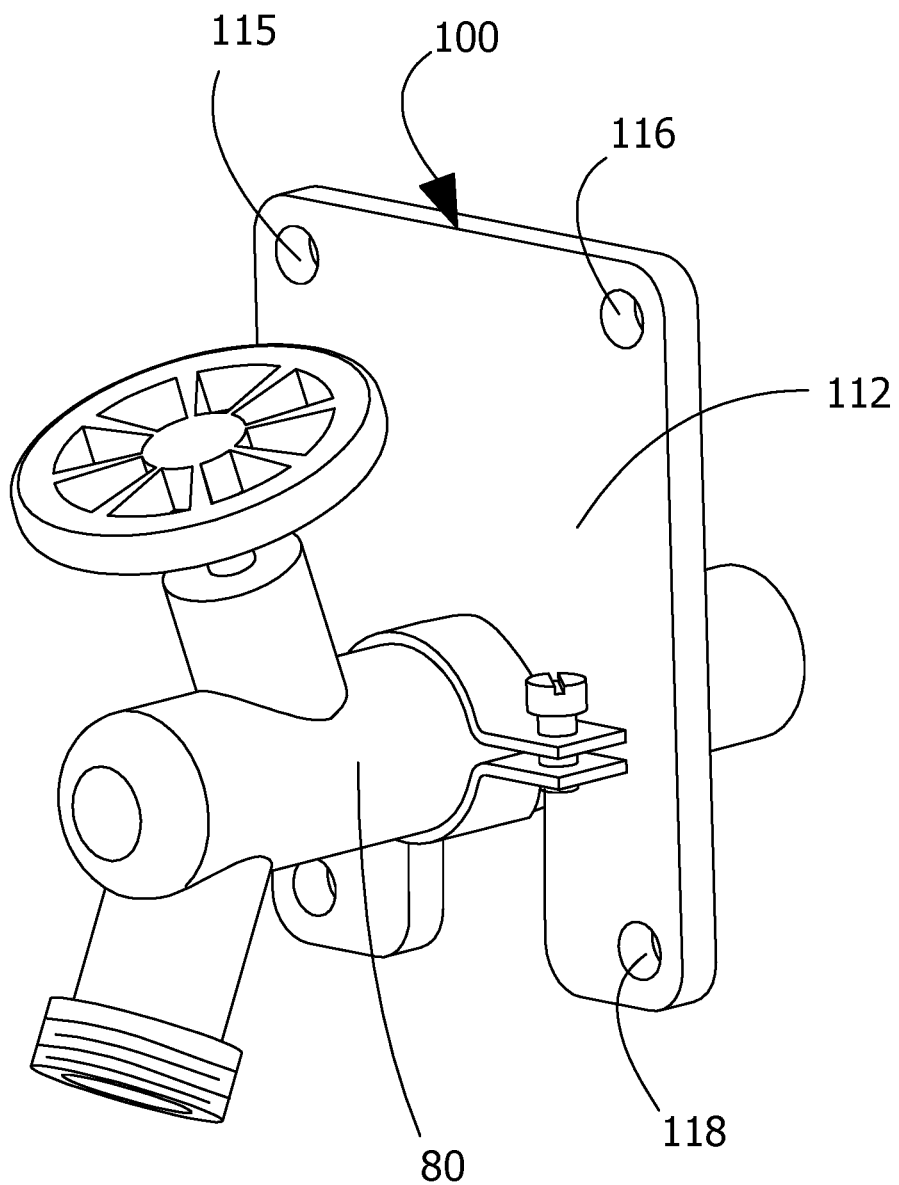
FIG. 8 is another environmental perspective view of the apparatus of FIG. 6.

A fixture accessory apparatus according to another embodiment of the invention is illustrated in FIGS. 6-8 and shown generally at reference numeral 100. The apparatus 100 comprises a plate 112 having a generally rectangular shape with circular openings 115, 116, 117, 118 formed proximate the four corners of the plate 112. A slot 114 is formed proximate the center of the plate 112. The apparatus 100 is particularly suitable for positioning in tight spaces between a fixture and the wall. FIG. 7 illustrates the apparatus 100 installed on a hose bib 50. FIG. 8 illustrates the apparatus installed on a spigot 80.

Figure 9:
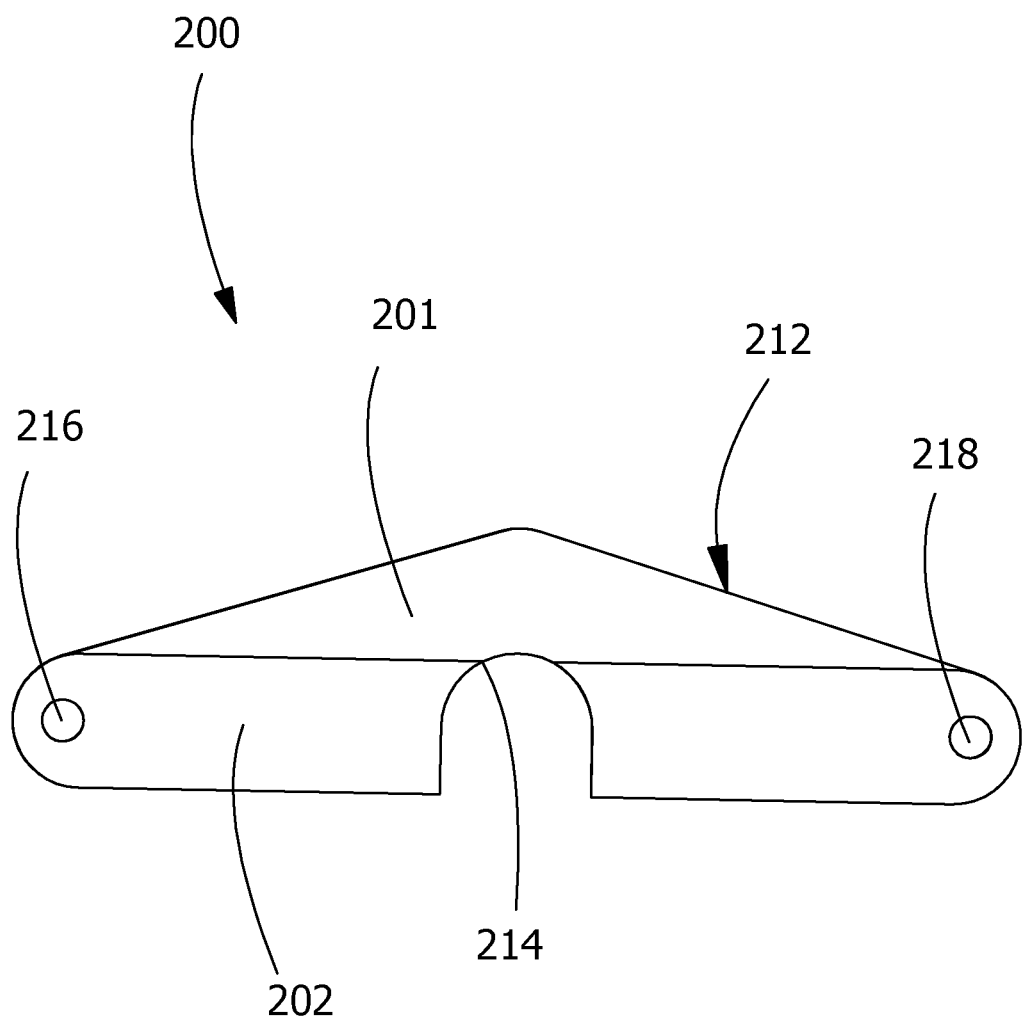
FIG. 9 is a fixture accessory apparatus according to another embodiment of the invention.
Figure 10:
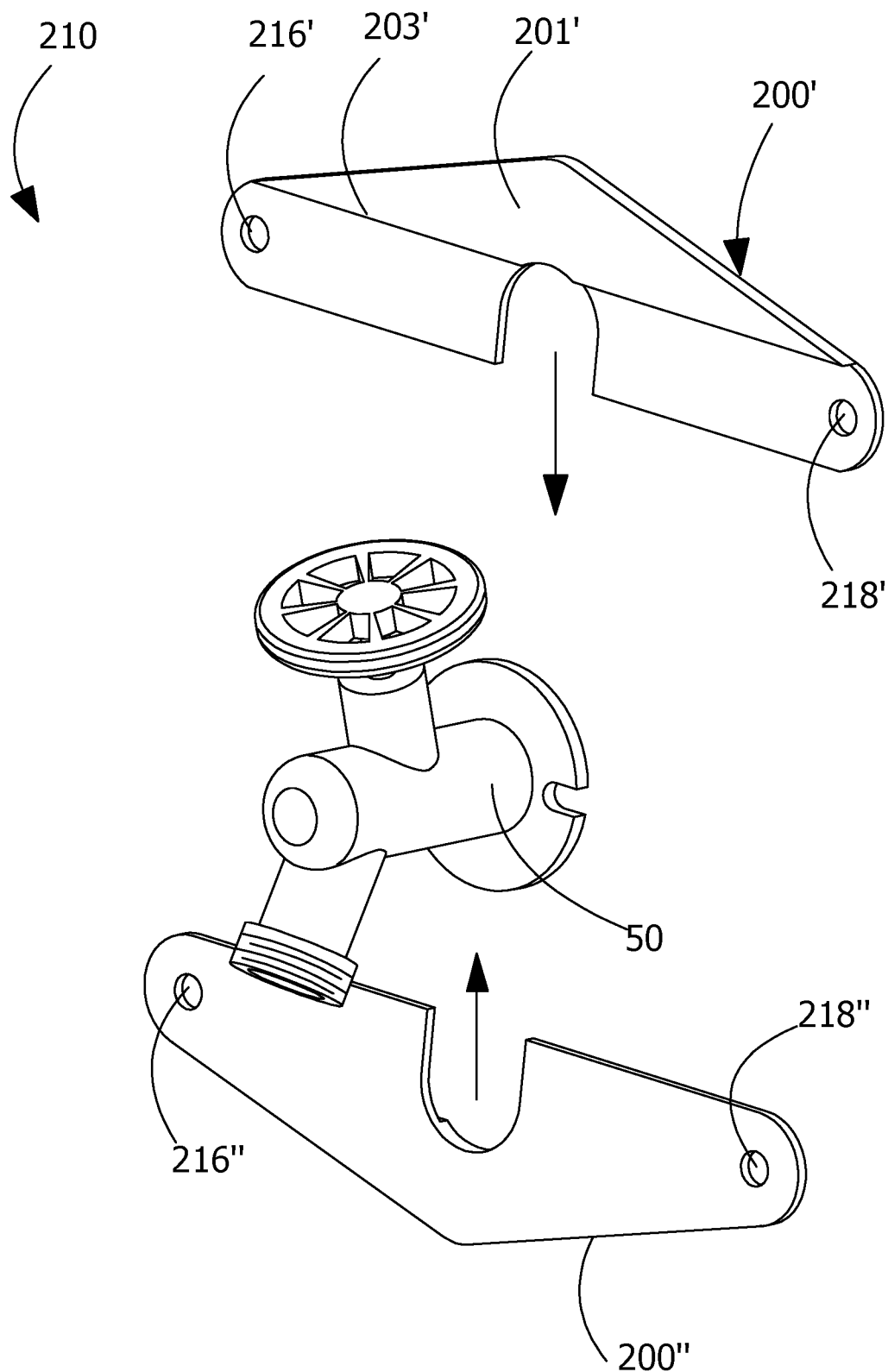
FIG. 10 is an environmental perspective view of the apparatus of FIG. 9.
Figure 11:
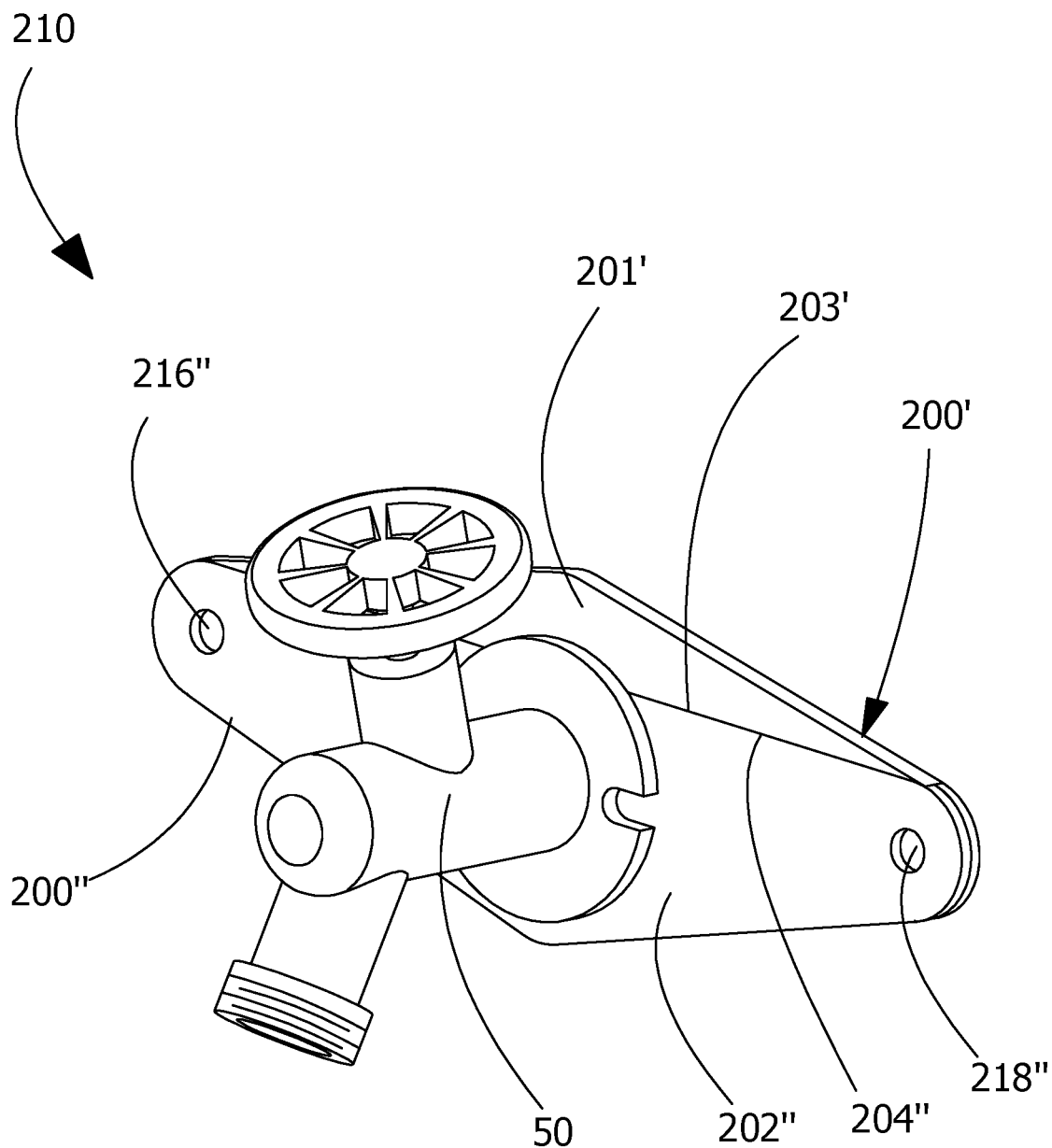
FIG. 11 is another environmental perspective view of the apparatus of FIG. 9.

A fixture accessory apparatus according to another embodiment of the invention is illustrated in FIG. 9 and shown generally at reference numeral 200. The apparatus 200 comprises a plate 212 having a slot 214 formed proximate the center of the plate 212 and first and second openings 216, 218 formed at opposite ends of the plate 212, as shown in FIG. 9. An upper portion 201 of the plate 212 has a depth or thickness approximately twice that of a lower portion 202 of the plate. As shown in FIGS. 10 and 11, two of the apparatuses 200 (200', 200") can be used together as a split plate assembly 210 to sandwich a fixture 50. One apparatus 200' is positioned above the fixture 50 while the other apparatus 200" is positioned below, and the apparatuses 200', 200" are slid together into complementary engagement, in which the openings 216', 216" and 218', 218" of the apparatuses 200', 200" are aligned with each other, as shown in FIGS. 10 and 11. The bi-level design of the apparatus 200 allows for two apparatuses 200', 200" to mate in a complementary engagement, in which a lower edge 203' of the upper (thicker) portion 201' of the upper apparatus 200' rests against the upper edge 204" of the thinner portion 202" of the lower apparatus 200", forming a substantially co-planar assembly 210. This assembly 210 can accept almost any fixture, not just those of a certain brand or size.

Figure 12:
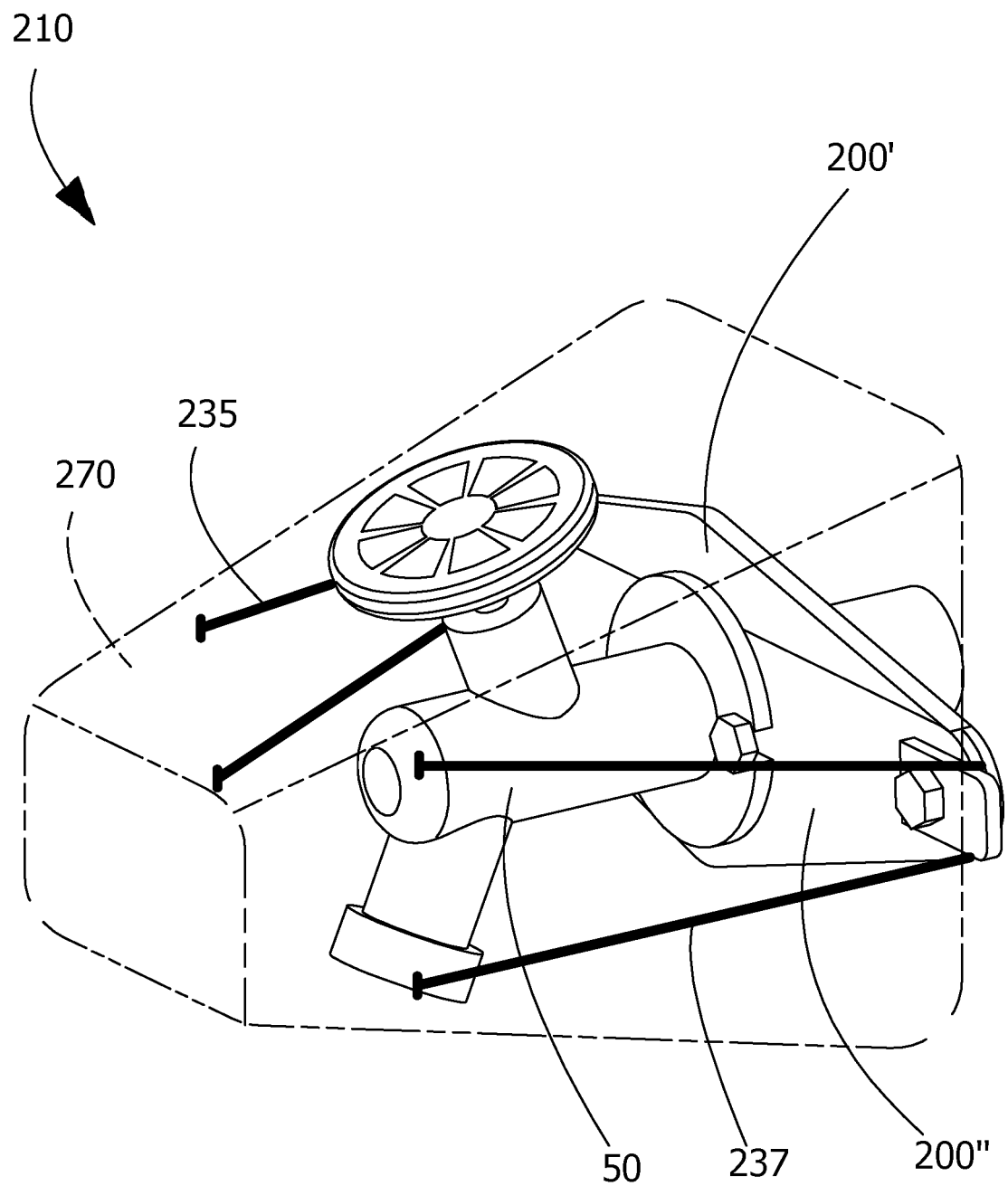
FIG. 12 is another environmental perspective view of the apparatus of FIG. 9.

According to a preferred embodiment of the invention, the assembly 210 can be a component of a kit adapted for use in a method to secure a freeze-protection cover 270 over the fixture 50, as shown in FIG. 12. The method utilizes the assembly 210 to hold the cover 270 centered and from both sides.

As shown in FIG. 12, two pairs of holes can be formed in the freeze-prevention cover 270, and an elongate elastic member, such as a marine bungee cord 235, can be positioned through each pair of holes in the cover 70. Each cord 235, 237 can be looped through one pair of holes in the cover 270, and each end of the cord 35, 37 can be tied in a knot 245, 247 within the interior of the cover 270 to attach the cord 235, 237 to the cover 270. Most of the length of each cord 235, 237 hangs on the outside of the cover 270. Preferably each cord 235, 237 is approximately fourteen inches long. Each bungee cord 235, 237 can be pulled outwardly from the cover 270 and positioned on one of the retaining clips of the assembly 210, as shown in FIG. 12. This securely maintains the freeze-prevention cover 270 over the fixture 50. The dual cords 235, 237 pull opposite sides of the cover 270 against the wall behind the fixture 50, providing a generally tighter attachment than conventional covers utilizing a single attachment cord. In addition, because the cords 235, 237 are external to the cover 270, it is significantly easier for the user to install over the fixture than conventional covers in which the attachment cord is housed inside the cover.

The size of the apparatus 200 can be varied to accommodate different fixtures in different environments. For example, the size of the apparatus 200 can be made small to use in tight spaces such as a framed enclosure, or on a small block.

Figure 13:
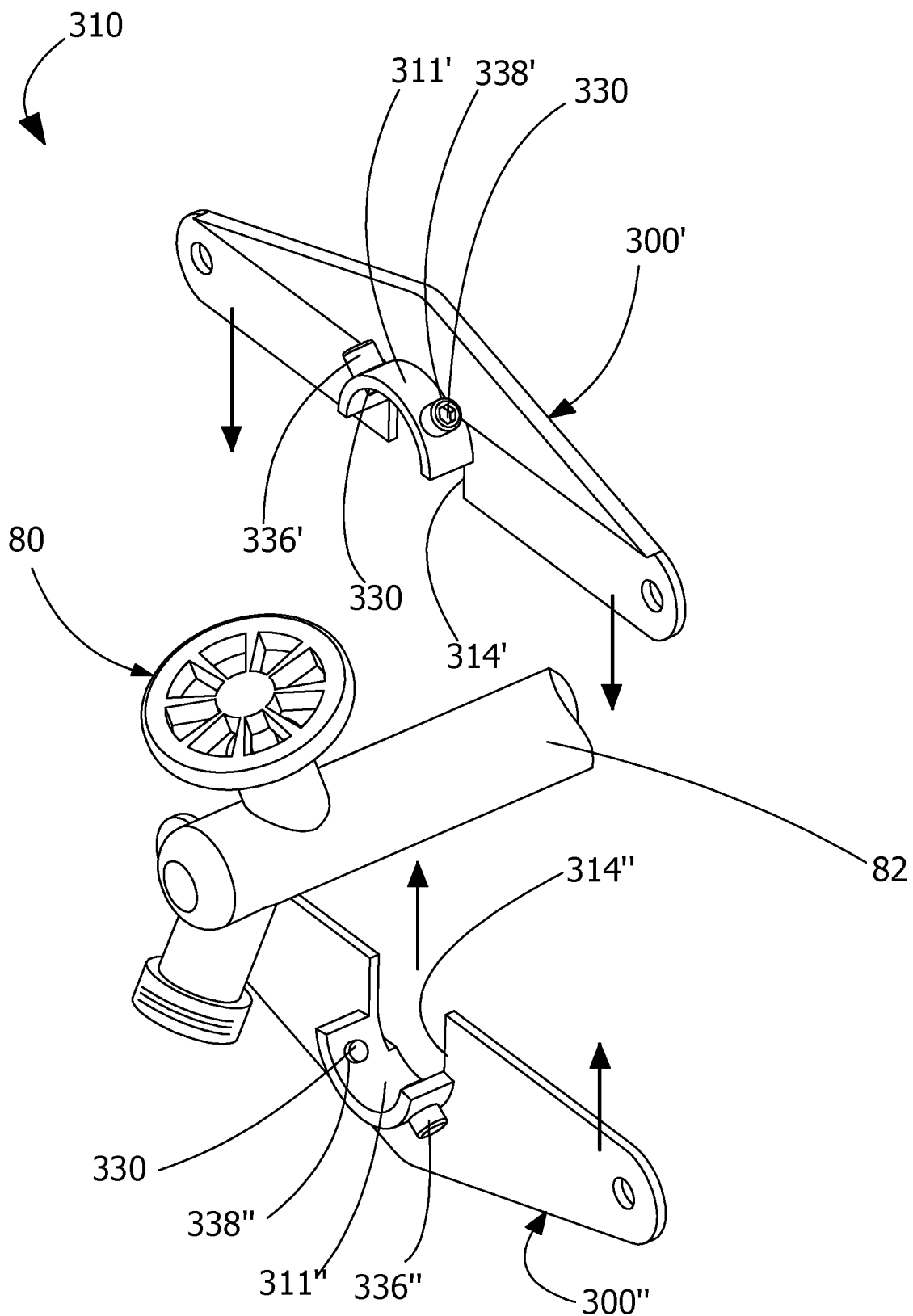
FIG. 13 is an environmental perspective view of a fixture accessory assembly according to another embodiment of the invention.
Figure 14:
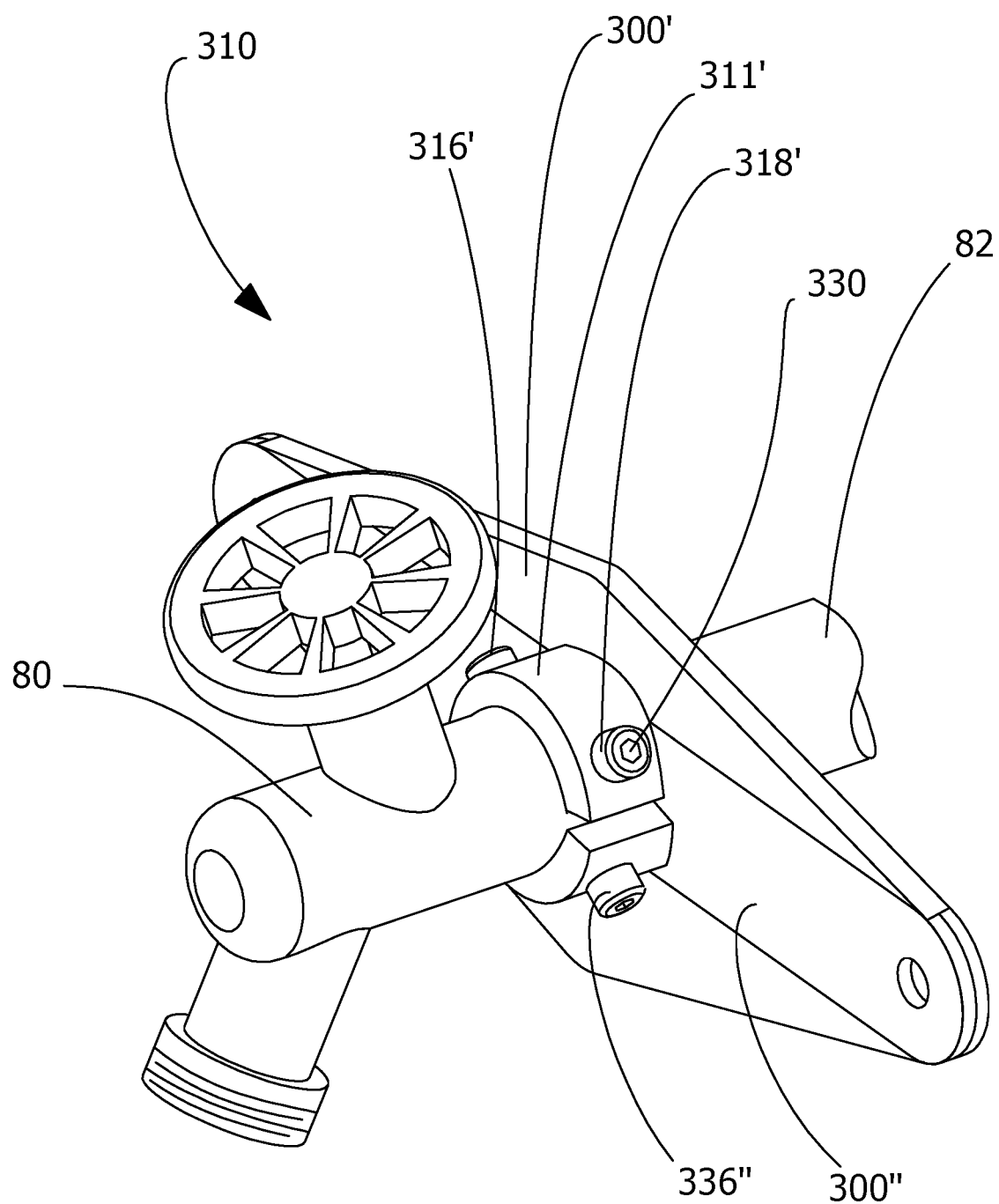
FIG. 14 is another environmental perspective view of the assembly of FIG. 13.

FIGS. 13 and 14 illustrate a dual plate kit assembly 310 according to another embodiment of the invention. The assembly 310 is adapted for use with a flangeless fixture, such as a spigot 80. The assembly 310 comprises first and second apparatuses 300', 300". Each apparatus 300', 300" is similar in design to the previously described apparatus 200, except that the apparatus 300', 300" includes an arcuate semi-tubular flange section 311', 311" positioned proximate the center slot 314', 314" of each apparatus 300', 300", as shown in FIG. 13. Each flange section 311', 311" has a plurality of ports 336', 338', 336", 338", respectively, formed therein for receiving an attachment member such as a screw 330 that can be positioned through the ports 336', 338', 336", 338". When the apparatuses 300', 300" are sandwiched together about a fixture 80, as shown in FIG. 14, the user can tighten the screws 330 in the ports 336', 338', 336", 338" against the fixture pipe 82 to secure the assembly 310 to the fixture 80.

Figure 15:
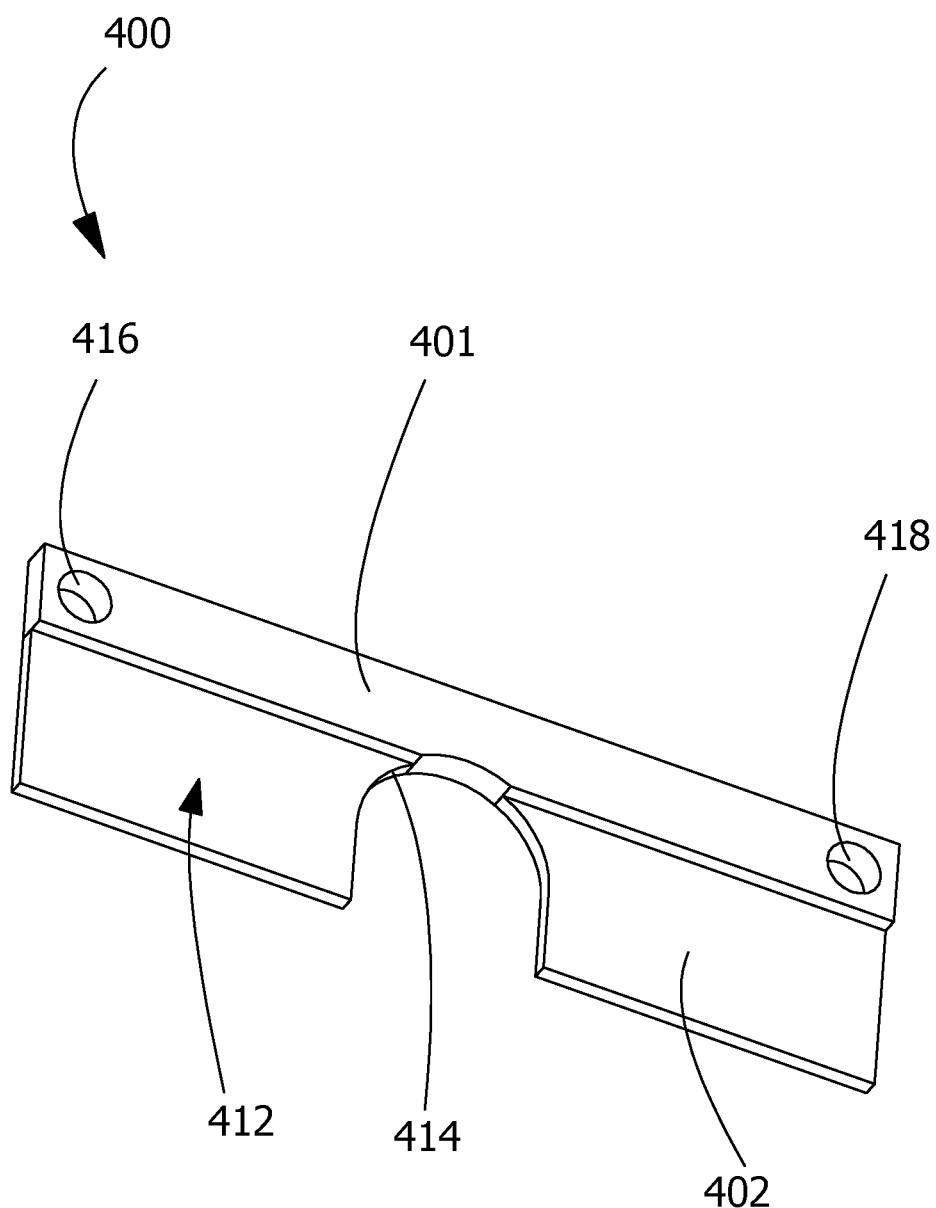
FIG. 15 is a perspective view of a fixture accessory apparatus according to another embodiment of the invention.
Figure 16:
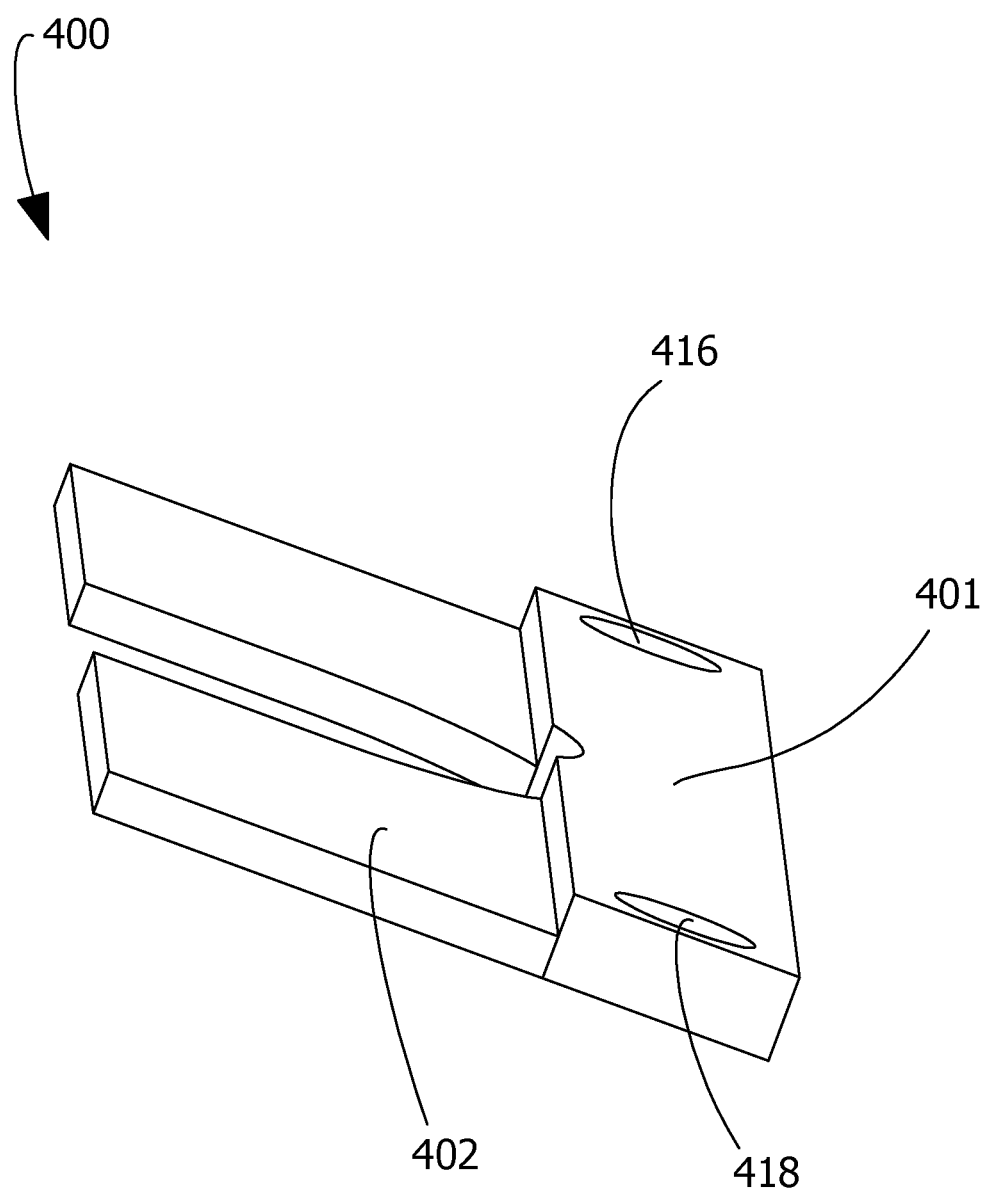
FIG. 16 is another perspective view of the apparatus of FIG. 15.
Figure 17:
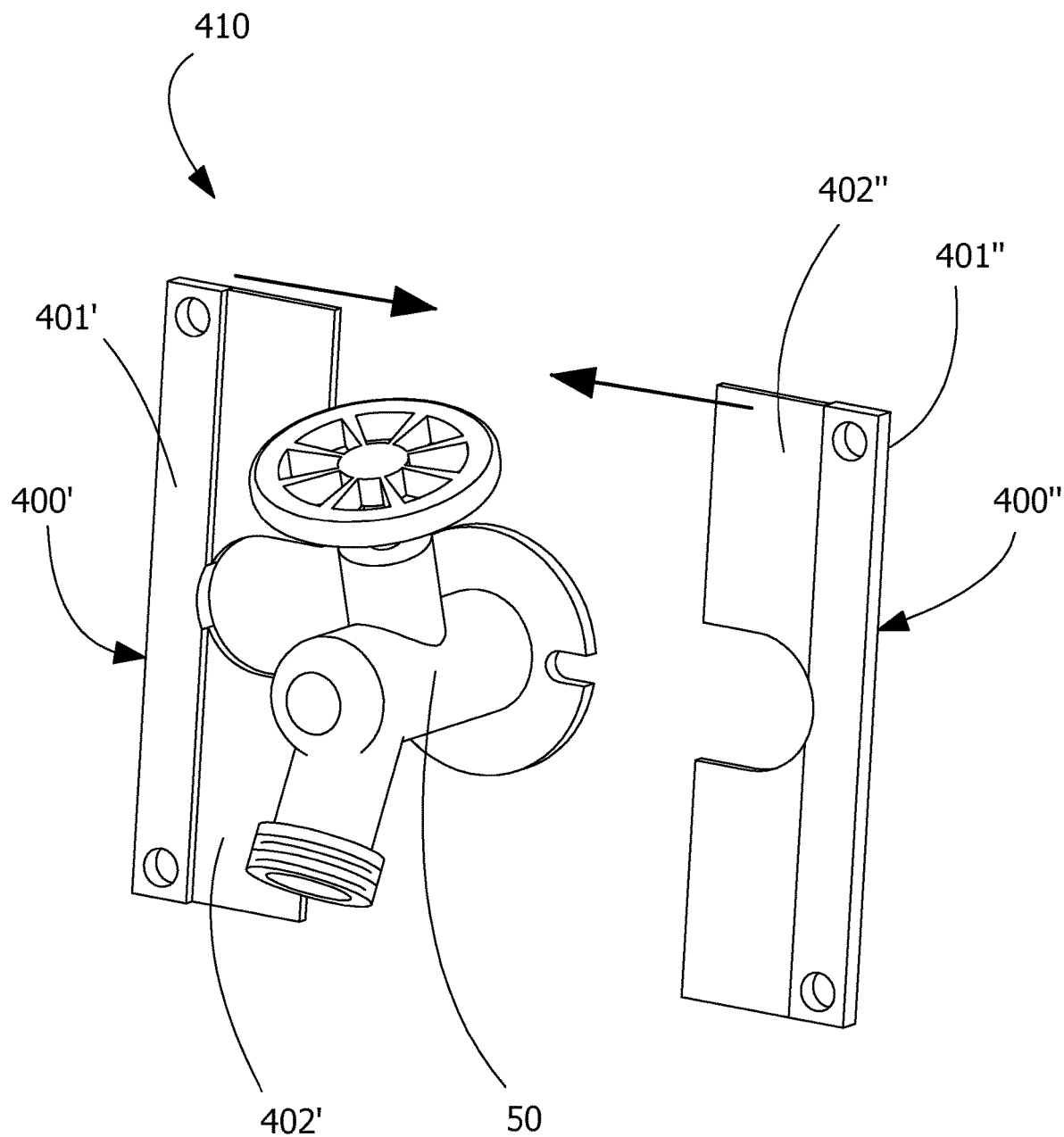
FIG. 17 is an environmental perspective view of the apparatus of FIG. 15.
Figure 18:
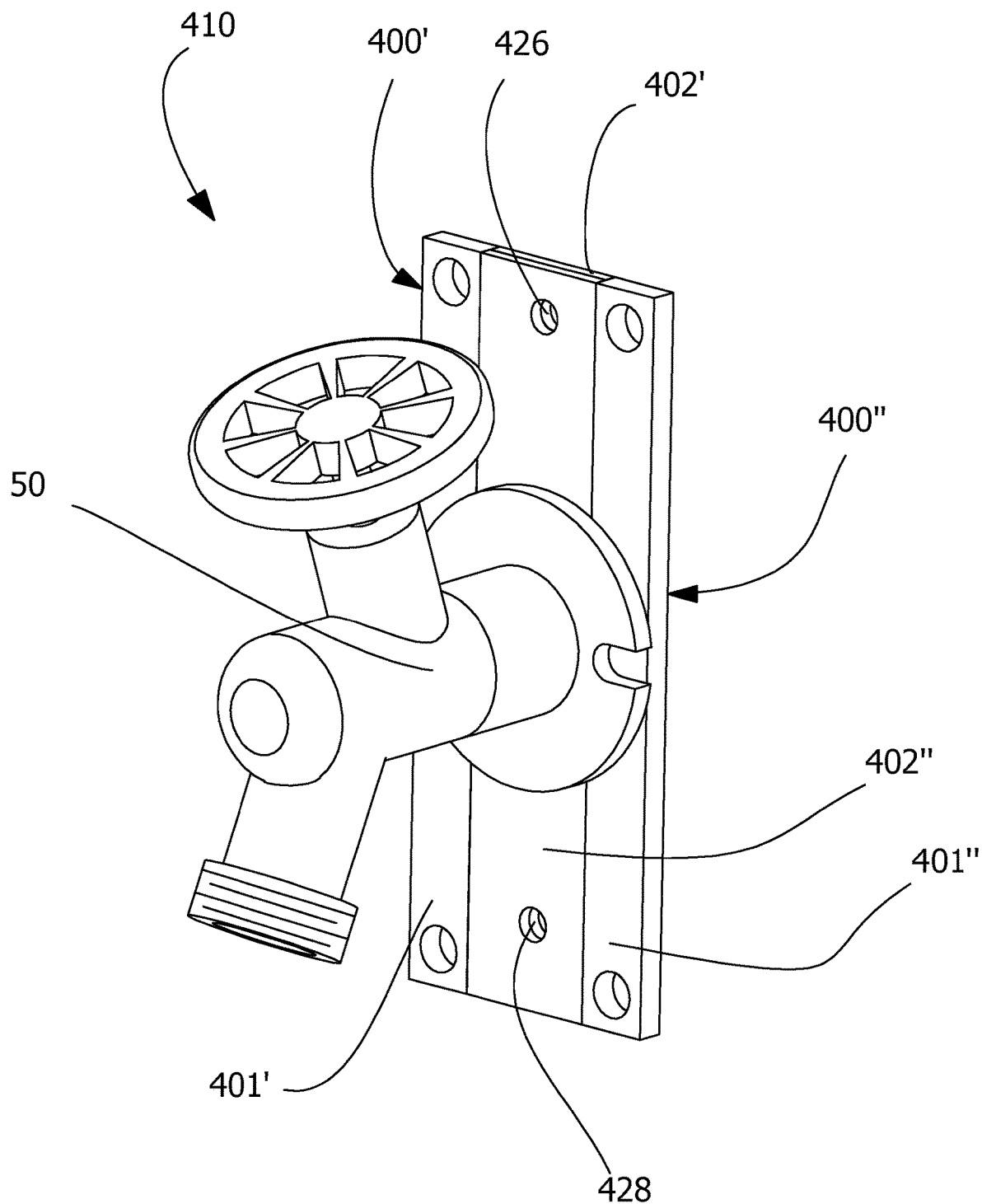
FIG. 18 is another environmental perspective view of the apparatus of FIG. 15.

A fixture accessory apparatus according to another embodiment of the invention is illustrated in FIGS. 15 and 16 and shown generally at reference numeral 400. The apparatus 400 comprises a plate 412 having a slot 414 formed proximate the center of the plate 412 and first and second openings 416, 418 formed at opposite ends of the plate 412, as shown in FIG. 15. A first section 401 of the plate 412 has a depth or thickness approximately twice that of a second section 402 of the plate 412. Two of the apparatuses 400, referenced as 400', 400" in FIGS. 17 and 18, can be used together as a dual plate assembly 410 to sandwich a fixture 50. One apparatus 400' can be positioned to a left side of the fixture 50 while the other apparatus 400" can be positioned to the right side of the fixture 50, as shown in FIG. 17. The apparatuses 400', 400" are slid together into complementary engagement, as shown in FIG. 18. The bi-level design of the apparatus 400 allows for two apparatuses 400', 400" to mate in a complementary engagement, in which the edge 403' of the thicker section 401' of one apparatus 400' rests against the outer edge 404" of the thinner section 402" of the other apparatus 400", forming a substantially co-planar assembly 410. A plurality of openings 426, 428 can be formed into the assembly 410 such as by drilling.

The assembly 410 can be used in a method to secure a freeze-protection cover over a fixture, as described above with regard to apparatus 10 and assembly 210. An embodiment of the invention comprises a kit adapted to secure a freeze-protection cover over a fixture comprising the assembly 410.

Embodiments of the invention described above provide an effective solution that fits almost any fixture and can be installed without removing the fixture or cutting and/or breaking any pipe. Furthermore, the main water supply does not need to be shut off for installation.

Embodiments of the present invention are adaptable across various disciplines, such as electrical fixtures when it is desired not to remove the wire or fixture, for bearings when it is desired not to remove the shaft, and for commercial plumbing and lighting fixtures.

A fixture accessory and methods of using same are described above. Various changes can be made to the invention without departing from its scope. The above description of various embodiments of the invention are provided for the purpose of illustration only and not limitation—the invention being defined by the claims and equivalents thereof.

What is claimed is:

1. A kit for use with a fixture extending from a wall comprising:
   (a) a plate member having a slot formed therein proximate a center of the plate member, the slot adapted to receive a portion of the fixture adjacent to the wall whereby the plate member can be positioned intermediate the fixture and the wall and frictionally engage the fixture and the wall, the plate member defining a first corner, a second corner opposite the first corner, a first opening formed proximate the first corner, and a second opening formed proximate the second corner, the slot being intermediate the first opening and the second opening;
   (b) a first retaining member adapted for attachment to the plate member to the left of the slot and a second retaining member adapted for attachment to the plate member to the right of the slot, wherein the slot is intermediate the first retaining member and the second retaining member when the first retaining member and the second retaining member are attached to the plate member; and
   (c) a first fastener and a second fastener, wherein the first fastener is adapted to be positioned through the first retaining member, the first opening and into the wall, and the second fastener is adapted to be positioned through the second retaining member, the second opening and into the wall.

2. The kit according to claim 1, wherein the fixture comprises a hose bib, sillcock or spigot.

3. The apparatus according to claim 1, wherein the fixture comprises a plumbing fixture attached to a pipe and the plate member can be attached to the fixture without disconnecting the fixture from the pipe.

4. The kit according to claim 1, further comprising means for attaching the plate member to the wall comprising at least one selected from the group consisting of screws, bolts, clamps, or an adhesive.

5. The kit according to claim 1, further comprising:
   (a) a freeze-prevention cover defining an outer edge for positioning against the wall and an interior area within the outer edge, the freeze-prevention cover adapted to contain the fixture within the interior area to prevent damage to the fixture caused by exposure to cold weather;
   (b) a first elongate cord member attached to the freeze-prevention cover and a second elongate cord member attached to the freeze-prevention cover; and
   (c) wherein the first retaining member and the second retaining member are positioned outside the interior area of the freeze-prevention cover when the outer edge of the freeze-prevention cover is positioned against the wall, and further wherein the first retaining member is adapted to engage the first elongate cord member extending outside the interior area of the cover and the second retaining member is adapted to engage the second elongate cord member extending outside the interior area of the cover.

6. A kit for securing a fixture extending from a wall, the fixture comprising a pipe, the kit comprising:
   (a) a first plate member having a slot formed therein proximate a center of the first plate member, the slot adapted to receive a portion of the fixture adjacent to the wall whereby the plate member can be positioned intermediate the fixture and the wall and frictionally engage the fixture and the wall, wherein the first plate member comprises an arcuate semi-tubular flange section positioned proximate the slot, the flange section having at least one port formed therein for receiving an attachment member therethrough to frictionally engage the pipe of the fixture, further wherein the first plate member defines a first corner and a second corner opposite the first corner, and a first opening positioned proximate the first corner and a second opening positioned proximate the second corner;
   (b) a freeze-prevention cover for positioning over the fixture adapted for attachment to the first plate member;
   (c) first and second elongate cord members attached to the freeze-prevention cover, and first and second retaining members adapted for attachment to the first plate member and engagement with the first and second elongate cord members, whereby the cover can be attached to the first plate member; and
   (d) a first fastener and a second fastener, wherein the first fastener is adapted to be positioned through the first retaining member and the first opening to attach the first retaining member to the first plate member, and the second fastener is adapted to be positioned through the second retaining member and the second opening to attach the second retaining member to the first plate member.

7. The kit according to claim 6, wherein the attachment member comprises a screw.

8. The kit according to claim 6, further comprising a second plate member having a slot formed therein proximate a center of the second plate member, the first plate member adapted to be positioned on a first side of the fixture and the second plate member adapted to be positioned on an opposite side of the fixture and moved into an overlapping orientation with the first plate member.

9. The kit according to claim 8, wherein each of the first plate member and the second plate member include a first section and a second section, the first section having a depth twice the depth of the second section.

10. The kit according to claim 6, wherein the fixture comprises a hose bib, sillcock or spigot.

11. A kit for use with a fixture extending from a wall comprising:
 (a) a plate member having a slot formed therein proximate a center of the plate member, the slot adapted to receive a portion of the fixture adjacent to the wall whereby the plate member can be positioned intermediate the fixture and the wall and frictionally engage the fixture and the wall;
 (b) a first retaining member adapted for attachment to the plate member to the left of the slot and a second retaining member adapted for attachment to the plate member to the right of the slot, wherein the slot is intermediate the first retaining member and the second retaining member when the first retaining member and the second retaining member are attached to the plate member;
 (c) a freeze-prevention cover defining an outer edge for positioning against the wall and an interior area within the outer edge, the freeze-prevention cover adapted to contain the fixture within the interior area to prevent damage to the fixture caused by exposure to cold weather;
 (d) a first elongate cord member attached to the freeze-prevention cover and a second elongate cord member attached to the freeze-prevention cover; and
 (e) wherein the first retaining member and the second retaining member are positioned outside the interior area of the freeze-prevention cover when the outer edge of the freeze-prevention cover is positioned against the wall, and further wherein the first retaining member is adapted to engage the first elongate cord member extending outside the interior area of the cover and the second retaining member is adapted to engage the second elongate cord member extending outside the interior area of the cover.

12. The kit according to claim 11, wherein first and second openings are formed in the plate member and the slot is intermediate the first and the second openings, each of the first and second openings adapted to receive a fastener therethrough and into the wall whereby the plate member is attached to the wall.

13. The kit according to claim 11, wherein the fixture comprises a hose bib, sillcock or spigot.

14. A method of securing a fixture extending from a wall, comprising the steps of:
 (a) providing a fixture accessory comprising a plate member having a first opening, a second opening, and a slot intermediate the first opening and the second opening, the slot positioned proximate the center of the plate member;
 (b) providing a freeze-prevention cover defining an outer edge and an interior area within the outer edge, a first elongate cord member attached to the freeze-prevention cover and a second elongate cord member attached to the freeze-prevention cover;
 (c) providing a first retaining member adapted to engage the first elongate cord member, and a second retaining member adapted to engage the second elongate cord member;
 (d) positioning the plate member intermediate the fixture and the wall with a portion of the fixture positioned within the slot;
 (e) positioning the first retaining member at the first opening and positioning a first fastener through the first retaining member and the first opening and into the wall, and positioning the second retaining member at the second opening and positioning a second fastener through the second retaining member and the second opening and into the wall whereby the first retaining member and the second retaining member are attached to the plate member and the plate member is attached to the wall;
 (f) positioning the outer edge of the freeze-prevention cover on the wall so that the fixture is positioned within the interior area of the cover and the first retaining member and the second retaining member are outside the outer edge of the cover; and
 (g) attaching the first elongate cord member to the first retaining member, and attaching the second elongate cord member to the second retaining member whereby the freeze-prevention cover is maintained against the wall with the fixture positioned within the interior area of the freeze-prevention cover.

15. The method according to claim 14, wherein the fixture comprises a plumbing fixture attached to a pipe and the fixture is not removed from the pipe.

* * * * *